United States Patent
Zhou et al.

(10) Patent No.: US 12,210,947 B2
(45) Date of Patent: Jan. 28, 2025

(54) ROAD CONDITION DEEP LEARNING MODEL

(71) Applicant: Waymo LLC, Mountain View, CA (US)

(72) Inventors: Xin Zhou, Novi, MI (US); Roshni Cooper, Cupertino, CA (US); Michael James, Northville, MI (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/238,741

(22) Filed: Aug. 28, 2023

(65) Prior Publication Data

US 2023/0409971 A1 Dec. 21, 2023

Related U.S. Application Data

(63) Continuation of application No. 17/978,287, filed on Nov. 1, 2022, now Pat. No. 11,775,870, which is a
(Continued)

(51) Int. Cl.
*G06N 20/00* (2019.01)
*B60W 40/06* (2012.01)
(Continued)

(52) U.S. Cl.
CPC ............. *G06N 20/00* (2019.01); *B60W 40/06* (2013.01); *B60W 60/0015* (2020.02);
(Continued)

(58) Field of Classification Search
CPC ............ G06N 3/08; G06N 3/082; G06N 3/10; G06N 3/12; G06N 5/00; G06N 7/00;
(Continued)

(56) References Cited

U.S. PATENT DOCUMENTS

| 5,765,119 A | 6/1998 | Otabe et al. |
| 8,744,822 B2 | 6/2014 | Mewes et al. |

(Continued)

FOREIGN PATENT DOCUMENTS

| DE | 102015109270 A1 | 12/2015 |
| DE | 102018203807 A1 | 9/2019 |

OTHER PUBLICATIONS

International Search Report and Written Opinion for Application No. PCT/US21/34520 dated Sep. 17, 2021 (10 pages).
(Continued)

*Primary Examiner* — Pegeman Karimi
(74) *Attorney, Agent, or Firm* — Botos Churchill IP Law LLP

(57) ABSTRACT

The technology relates to using on-board sensor data, off-board information and a deep learning model to classify road wetness and/or to perform a regression analysis on road wetness based on a set of input information. Such information includes on-board and/or off-board signals obtained from one or more sources including on-board perception sensors, other on-board modules, external weather measurement, external weather services, etc. The ground truth includes measurements of water film thickness and/or ice coverage on road surfaces. The ground truth, on-board and off-board signals are used to build the model. The constructed model can be deployed in autonomous vehicles for classifying/regressing the road wetness with on-board and/or off-board signals as the input, without referring to the ground truth. The model can be applied in a variety of ways to enhance autonomous vehicle operation, for instance by altering current driving actions, modifying planned routes or trajectories, activating on-board cleaning systems, etc.

20 Claims, 19 Drawing Sheets

Related U.S. Application Data continuation of application No. 16/893,664, filed on Jun. 5, 2020, now Pat. No. 11,521,127.

(51) Int. Cl.
*B60W 60/00* (2020.01)
*G05D 1/00* (2006.01)
*G06N 3/08* (2023.01)

(52) U.S. Cl.
CPC ......... *G05D 1/0231* (2013.01); *G05D 1/0255* (2013.01); *G05D 1/0257* (2013.01); *G06N 3/08* (2013.01); *B60W 2420/403* (2013.01); *B60W 2420/408* (2024.01); *B60W 2420/54* (2013.01); *B60W 2555/20* (2020.02)

(58) Field of Classification Search
CPC ........ G06N 3/088; G06N 7/023; G06N 20/00; G06N 20/10; G06N 20/20; B60W 60/0015; B60W 40/06; G05D 1/0231; G05D 1/0255; G05D 1/0257
See application file for complete search history.

(56) References Cited

U.S. PATENT DOCUMENTS

| | | | |
|---|---|---|---|
| 9,110,196 B2 | 8/2015 | Urmson et al. | |
| 9,139,204 B1 | 9/2015 | Zhao et al. | |
| 2014/0067187 A1* | 3/2014 | Ferguson | B60W 60/0011 701/28 |
| 2015/0178572 A1 | 6/2015 | Omer et al. | |
| 2017/0161570 A1 | 6/2017 | Zhao et al. | |
| 2018/0060674 A1* | 3/2018 | Zhao | G06V 10/811 |
| 2018/0129215 A1 | 5/2018 | Hazelton et al. | |
| 2018/0170375 A1 | 6/2018 | Jang et al. | |
| 2019/0130182 A1 | 5/2019 | Zang et al. | |
| 2019/0147371 A1 | 5/2019 | Deo et al. | |
| 2019/0195628 A1 | 6/2019 | Lam et al. | |
| 2019/0250630 A1 | 8/2019 | Zhao et al. | |
| 2019/0266493 A1 | 8/2019 | Gao et al. | |
| 2019/0333375 A1* | 10/2019 | Malkes | G01W 1/10 |
| 2020/0008028 A1 | 1/2020 | Yang | |
| 2020/0349833 A1 | 11/2020 | Lerner et al. | |
| 2020/0406897 A1 | 12/2020 | Hartmann et al. | |
| 2021/0056778 A1 | 2/2021 | Wylie et al. | |

OTHER PUBLICATIONS

Lufft Marwis-UMB brochure, www.lufft.com, retrieved from the internet Apr. 9, 2020, pp. 1-12.
Operating Manual Marwis-UMB/Starwis-UMB, www.lufft.com, Dec. 2019, pp. 2-59.
Bender, Gabriel, et al., Understanding and Simplifying One-Shot Architecture Search, 2018, pp. 1-10.
Golovin, Daniel, et al., Google Vizier: A Service for Black-Box Optimization, Google Research, 2017, pp. 1-10.
Han, Xiaofeng, et al., "Single Image Water Hazard Detection using FCN with Reflection Attention Units", European Conference on Computer Vision (ECCV) 2018, Oct. 6, 2018., 4, 9.
Rau, Peter, User Manual—Marwis App, App Version 1.15, Sep. 2017, pp. 1-23.
Sanders, P. D., et al., Splash and spray assessment tool development program First interim report: revised synthesis report, Published Project Report, PPR602, 2012, pp. 1-41.
Wang, Li, et al., "Water Hazard Detection Using Conditional Generative Adversarial Network With Mixture Reflection Attention Units", IEEE Access, vol. 7, pp. 167497-167506, Nov. 15, 2019., 167497-167499.
Zoph, Barret, et al., Learning Transferable Architectures for Scalable Image Recognition, arXiv:1707.07012v4, Apr. 2018 pp. 1-14.
The Extended European Search Report for European Patent Application No. 21818101.4, Mar. 14, 2024, 8 Pages.

* cited by examiner

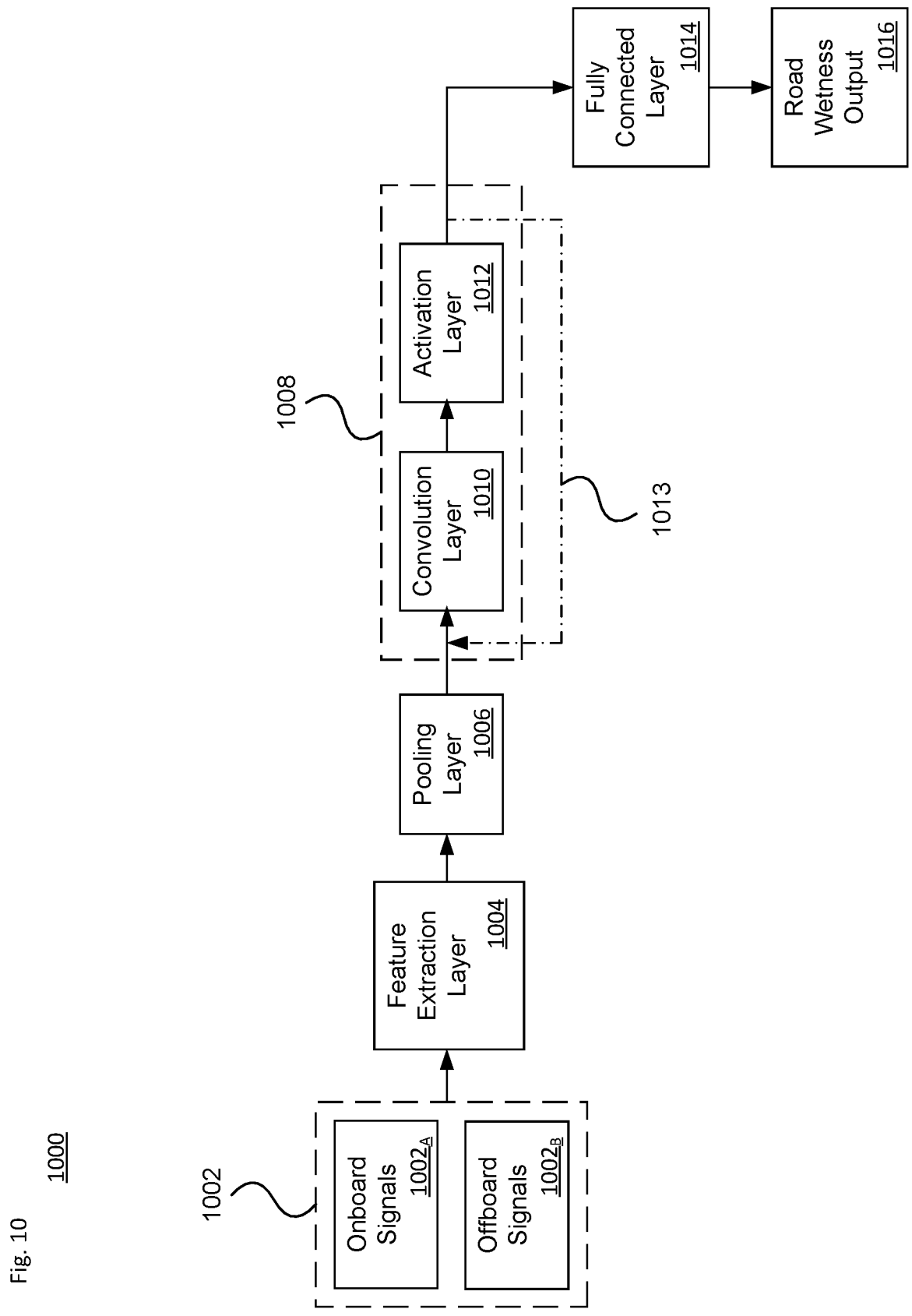

ROAD CONDITION DEEP LEARNING MODEL

CROSS-REFERENCE TO RELATED APPLICATIONS

This application is a continuation of U.S. application Ser. No. 17/978,287, filed on Nov. 1, 2022, which is a continuation of U.S. application Ser. No. 16/893,664, filed on Jun. 5, 2020 and issued as U.S. Pat. No. 11,521,127, the disclosures of which are incorporated herein by reference. This application is related to U.S. application Ser. No. 17/828,196, filed May 31, 2022 and issued as U.S. Pat. No. 11,521,130, which is a divisional of the '664 application.

BACKGROUND

Autonomous vehicles, such as vehicles that do not require a human driver, can be used to aid in the transport of passengers or cargo from one location to another. Such vehicles may operate in a fully autonomous mode or a partially autonomous mode where a person may provide some driving input. In order to operate in an autonomous mode, the vehicle may employ various on-board sensors to detect features of the external environment, and use received sensor information to perform various driving operations. Road conditions including water on the roadway may adversely impact operation of the vehicle, including how information from the sensor system is evaluated, when a wiper system is engaged, real-time and planned driving behavior, among other issues.

BRIEF SUMMARY

The technology relates to using on-board sensor signals, other environmental information and a deep learning (DL) model to classify road wetness and/or to perform a regression analysis on road wetness based on a set of input information. The input information may include on-board and/or off-board signals obtained from one or more sources such as on-board perception sensors mounted along the vehicle, other vehicle on-board modules, external weather measurement, external weather services, etc. Ground truth includes measurements of water thickness on road surfaces, such as water film thickness and/or ice coverage. The ground truth, on-board signals from sensors or systems of the vehicle, and off-board signals from sources other than the particular vehicle, are used to build a DL model. The constructed model can be deployed in autonomous vehicles for classifying/regressing the road wetness with on-board and/or off-board signals as the input, without referring to or otherwise relying on the ground truth during real-world autonomous driving. The model can be applied in a variety of ways to enhance autonomous vehicle operation, for instance by altering current driving actions, modifying planned routes or trajectories, activating on-board cleaning systems, etc.

According to one aspect, a method for generating a road condition deep learning model is provided. The method comprises receiving as a first set of training inputs, by one or more processors, sensor data of an environment along a portion of a roadway from one or more on-board vehicle sensors; receiving as a second set of training inputs, by the one or more processors, off-board information associated with the portion of the roadway; evaluating, by the one or more processors, the received first set of training inputs and the received second set of training inputs with respect to ground truth data for the portion of the roadway, the ground truth data including one or more measurements of water thickness across one or more areas of the portion of the roadway to give classification or continuous estimation of wetness along the one or more areas of the portion of the roadway, wherein the evaluating generates road wetness information based on the received first and second sets of training inputs and the ground truth data; generating the road condition deep learning model from the road wetness information; and storing the generated road condition deep learning model in memory.

The received sensor data may include one or more of lidar returns, camera still images, camera video, radar returns, audio signals, or output from a vehicle on-board module. The off-board information may include one or more of weather station information, public weather forecasts, road graph data, crowdsourced information, or observations from one or more other vehicles.

The method may further comprise performing signal fusion of some or all of the received sensor data and the received off-board information. The method may also include applying weighting to different signals of the received sensor data. In an example, the method further includes, prior to construction of the road condition deep learning model, performing a statistical analysis to determine which received sensor data correlates with the ground truth data. Here, the method may also include deemphasizing any received sensor data that does not meet a correlation threshold with the ground truth data.

The method may further include, prior to construction of the road condition deep learning model, masking out information of one or more dynamic objects on the roadway from the received sensor data. The method may include, prior to construction of the road condition deep learning model, limiting the received sensor data to a selected range or distance from the one or more vehicle sensors. The method may include smoothing ground truth measurements of the ground truth data prior to construction of the road condition deep learning model.

In an example, the method further includes applying the road condition deep learning model to one or more roadway regions to either identify a probability of wetness for each of the regions or estimate water film depth for each of the region. In another example, the method includes causing one or more systems of a self-driving vehicle to perform at least one of altering a current driving action, modifying a planned route or trajectory, or activating an on-board cleaning system of the self-driving vehicle based on the road condition deep learning model output.

In a further example, storing the generated road condition deep learning model in memory comprises storing the generated road condition deep learning model in memory of one or more vehicles that are not equipped with a ground truth measurement sensor. The stored road condition deep learning model is configured for use in evaluating real-time road wetness based on real-time sensor data and selected off-board information.

The ground truth data may include human-labeled road wetness examples. And the one or more measurements of water thickness may be one or more measurements of water film thickness or ice coverage across the one or more areas of the portion of the roadway.

According to another aspect, a system is configured to operate a vehicle in an autonomous driving mode. The system includes memory storing a road condition deep learning model. The model relates to a discrete classification or continuous regression/estimation of road wetness. The system also includes one or more processors operatively coupled to the memory. The one or more processors are configured to receive sensor data from one or more sensors of a perception system of the vehicle while operating in the autonomous driving mode. The one or more sensors are configured to detect objects or conditions in an environment around the vehicle. The one or more processors are configured to use the stored model to generate information associated with the discrete classification or continuous regression/estimation of road wetness based on the received sensor data, and to use the generated information to control operation of the vehicle in the autonomous driving mode.

In one example, the model is formed by evaluating a first set of training inputs of sensor data of an environment along a portion of a roadway from one or more on-board sensors and a second set of training inputs of off-board information associated with the portion of the roadway with respect to ground truth data for the portion of the roadway. The ground truth data includes one or more measurements of water thickness across one or more areas of the portion of the roadway. The first set of training inputs of sensor data may include one or more of lidar returns, camera still images, camera video, radar returns, audio signals, or output from a vehicle on-board module. The second set of training inputs of off-board information may include one or more of weather station information, public weather forecasts, road graph data, crowdsourced information, or observations from one or more other vehicles.

Controlling operation of the vehicle in the autonomous mode using the generating information may include at least one of alteration of a current driving action, modification of a planned route or trajectory, or activation of an on-board cleaning system.

According to another aspect, a vehicle is able to operate in an autonomous driving mode, in which the vehicle includes the system configured to operate the vehicle as well as the on-board perception system as discussed above.

BRIEF DESCRIPTION OF THE DRAWINGS

FIG. 10 illustrates an example road condition deep learning model in accordance with aspects of the technology.

FIGS. 12A-B illustrate an example system in accordance with aspects of the technology.

DETAILED DESCRIPTION

As noted above, aspects of the technology use ground truth information about road wetness, input from one or more of the following sources such as other on-board sensor signals and/or signals from other on-board modules, and off-board signals to develop a DL model for road wetness classification, as well as to perform a road wetness regression analysis. Certain data (e.g., on-board sensors and off-board signals) is used in the DL model, while other data (e.g., ground-truth info) may only be used only for training. Thus, a deployed system does not require that the ground-truth sensors be installed on the vehicle. For instance, training inputs are evaluated with respect to ground truth information for a given roadway segment. The output of the DL model can be used in a variety of ways to enhance autonomous vehicle operation, for instance by altering current driving actions, modifying planned routes or trajectories, activating on-board cleaning systems, etc.

Example Vehicle Systems

Figure 1A:
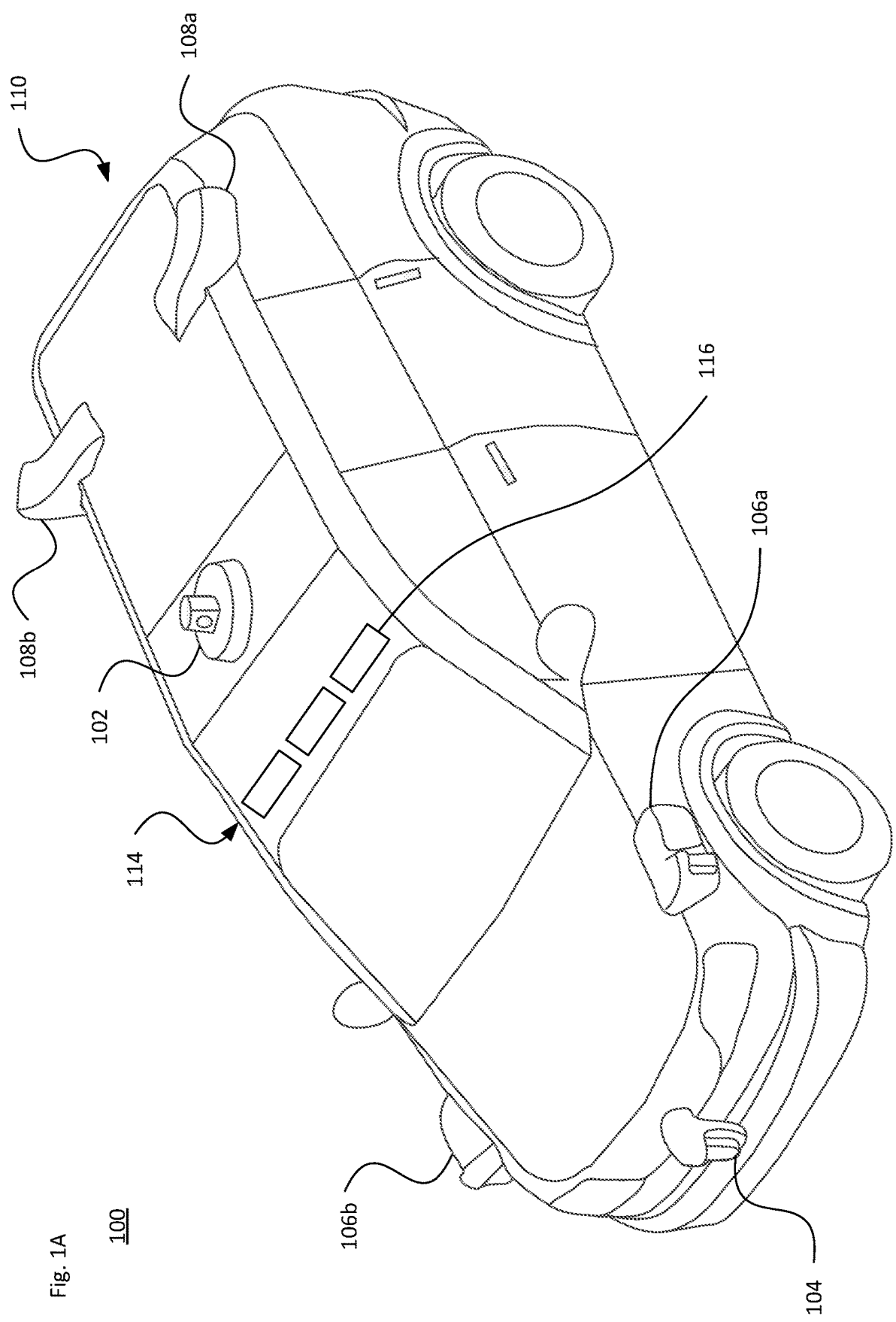
FIGS. 1A-B illustrate an example passenger-type vehicle configured for use with aspects of the technology.
Figure 1B:
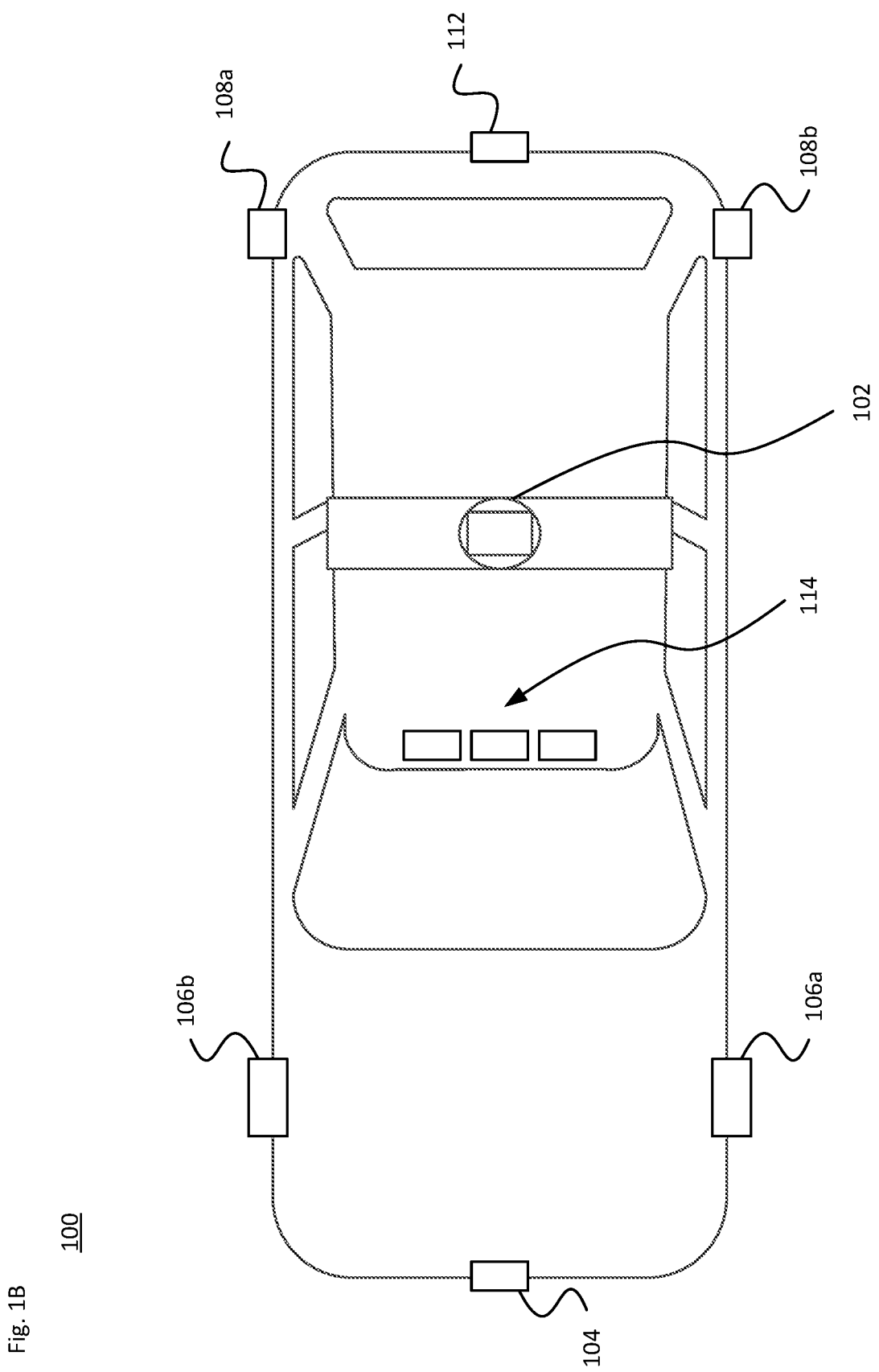

FIG. 1A illustrates a perspective view of an example passenger vehicle 100, such as a minivan, sport utility vehicle (SUV) or other vehicle. FIG. 1B illustrates a top-down view of the passenger vehicle 100. The passenger vehicle 100 may include various sensors for obtaining information about the vehicle's external environment. For instance, a roof-top housing 102 may include a lidar sensor as well as various cameras, radar units, infrared and/or acoustical sensors. Housing 104, located at the front end of vehicle 100, and housings 106a, 106b on the driver's and passenger's sides of the vehicle may each incorporate Lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

Figure 1C:
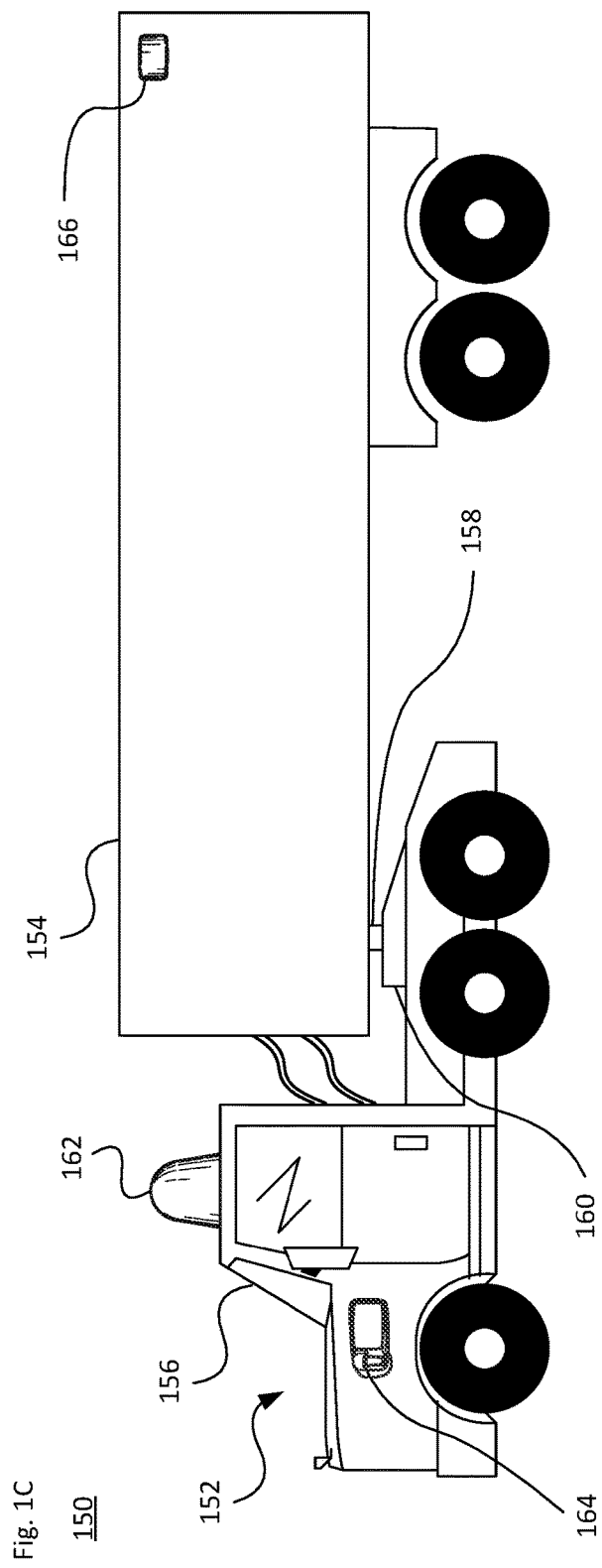
FIGS. 1C-D illustrate an example cargo-type vehicle configured for use with aspects of the technology.
Figure 1D:
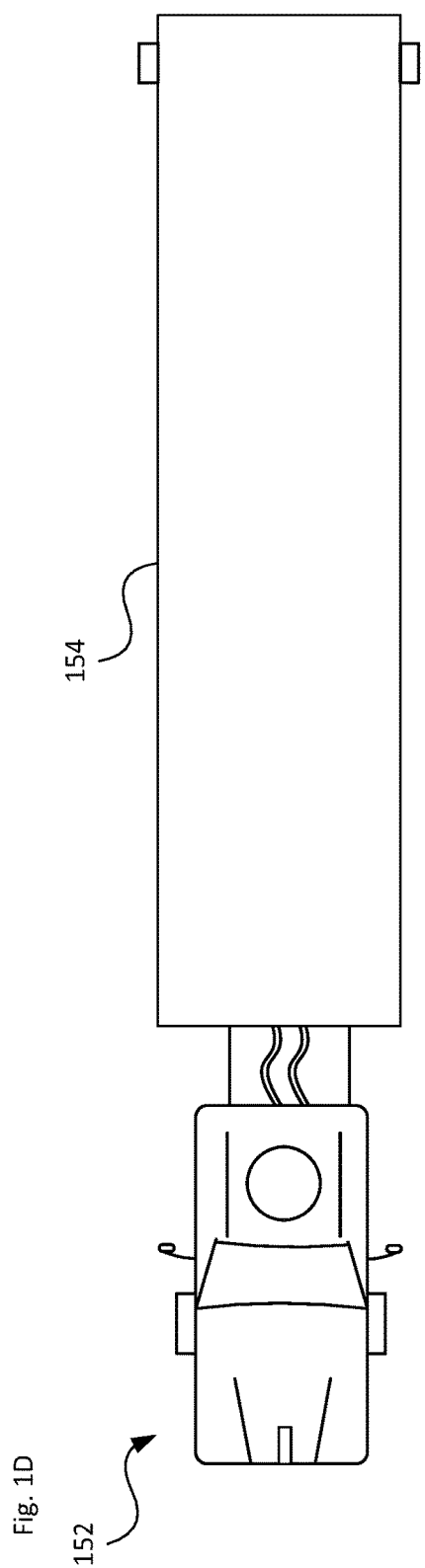

FIGS. 1C-D illustrate an example cargo vehicle 150, such as a tractor-trailer truck. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers. In a fully autonomous arrangement, the cab 156 may not be equipped with seats or manual driving components, since no person may be necessary.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

By way of example, each sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
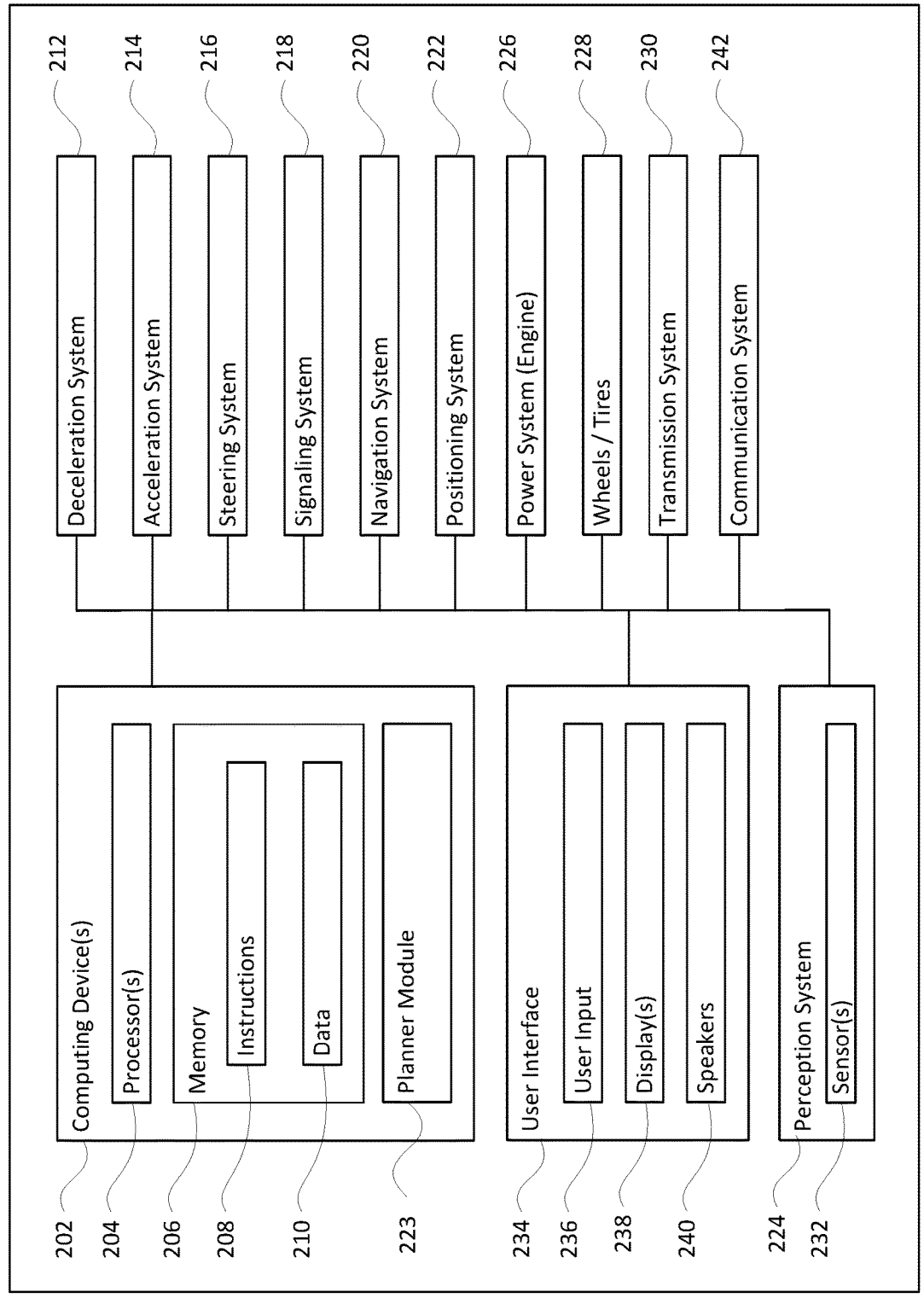
FIG. 2 is a block diagram of systems of an example passenger-type vehicle in accordance with aspects of the technology.

FIG. 2 illustrates a block diagram 200 with various components and systems of an exemplary vehicle, such as passenger vehicle 100, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects and conditions in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216 to the left or to the right), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways (e.g., including dips, angles, etc.), lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects and environmental factors external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway. A selected vehicle may include enhanced sensors to provide water measurements for a roadway segment. By way of example only, a road weather information sensor from Lufft may be employed.

By way of example only, the perception system 224 may include one or more light detection and ranging (lidar) sensors and/or LED emitters, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc. Ambient conditions (e.g., temperature and humidity) and roadway conditions such as surface temperature, dew point and/or relative humidity, water film thickness, precipitation type, etc. may also be detected by one or more types of these sensors.

The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 312, and other factors associated with the equipment of the vehicle itself.

The raw data from the sensors, including the roadway condition sensors, and the aforementioned characteristics can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects and roadway conditions when needed to reach the location safely, e.g., via adjustments made by planner module 223. In addition, the computing devices 202 may perform calibration of individual sensors, all sensors in a particular sensor assembly, or between sensors in different sensor assemblies or other physical housings.

As illustrated in FIGS. 1A-B, certain sensors of the perception system 224 may be incorporated into one or more exterior sensor assemblies or housings. In one example, these may be integrated into the side-view mirrors on the vehicle. In another example, other sensors may be part of the roof-top housing 102, or other sensor housings or units 104, 106*a,b*, 108*a,b*, 112 and/or 116. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The passenger vehicle also includes a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
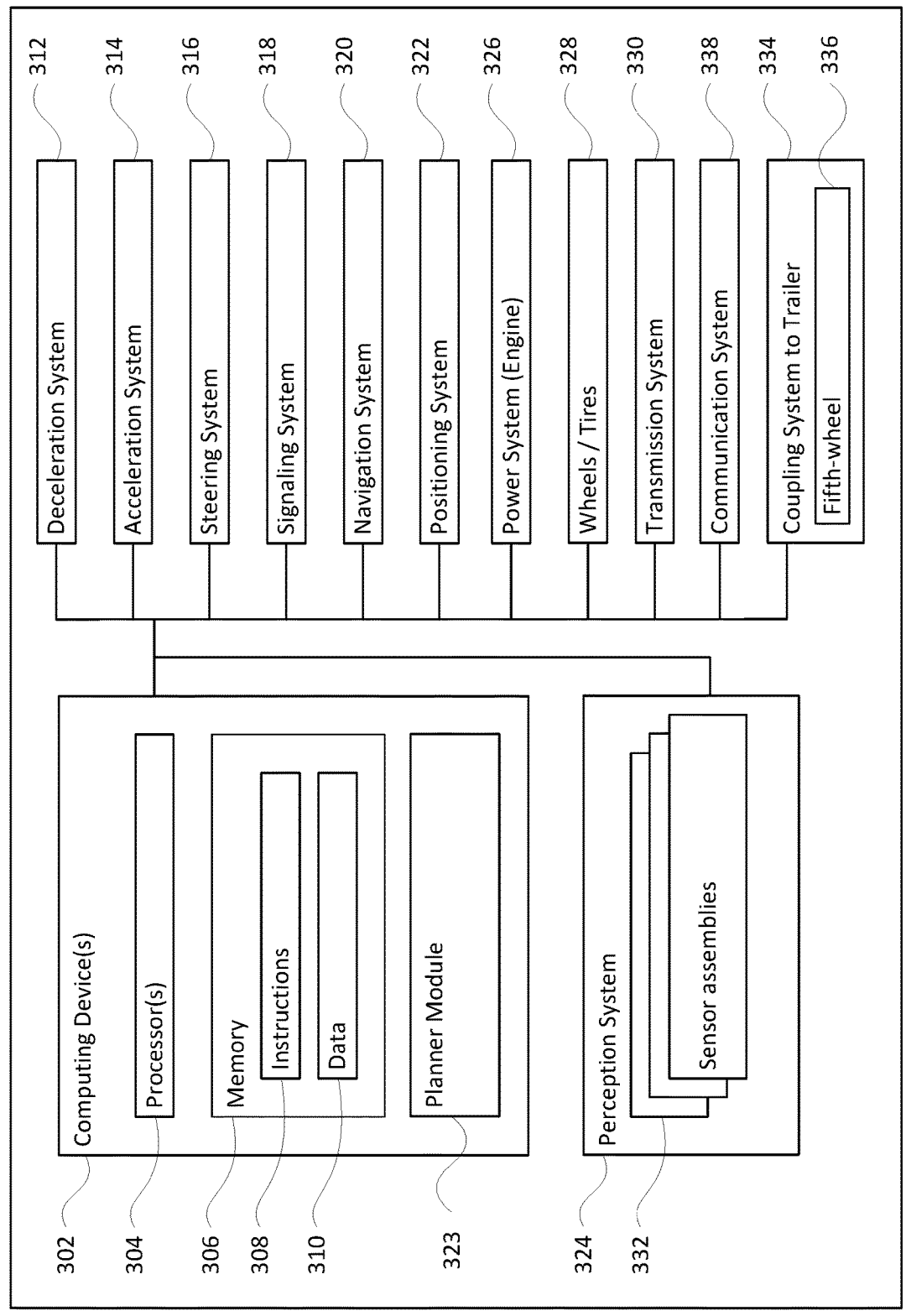
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIG. 1C. By way of example, the vehicle may be a truck, bus, farm equipment, construction equipment, emergency vehicle or the like, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects and environmental condition (including roadway conditions) external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Figure 3B:
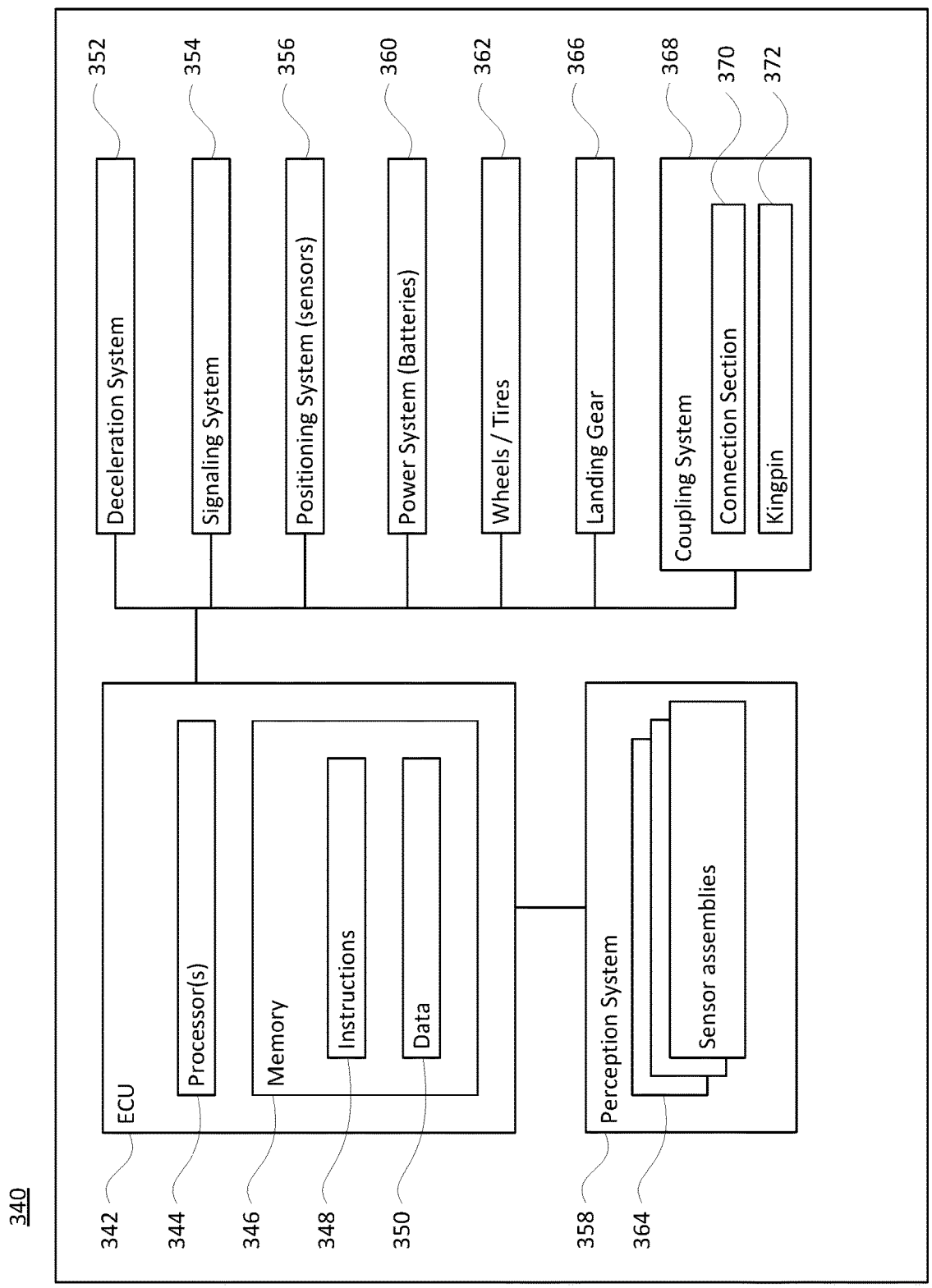

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 254, and a positioning system 356. The ECU 342 may also be operatively coupled to a perception system 358 with one or more sensors for detecting objects and/or conditions in the trailer's environment and a power system 260 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear provides a support structure for the trailer when decoupled from the tractor unit. The coupling system 368, which may be a part of coupling system 334, provides connectivity between the trailer and the tractor unit. Thus, the coupling system 368 may include a connection section 370 (e.g., for power and/or pneumatic links). The coupling system also includes a kingpin 372 configured for connectivity with the fifth-wheel of the tractor unit.

Example Implementations

In view of the structures and configurations described above and illustrated in the figures, various aspects will now be described in accordance with aspects of the technology.

While models for road surface and other conditions may be trained on human-labeled data, such an approach is subjective and can be error-ridden. Thus, selected sensor data is employed as a ground truth to the model. Various model architectures can be employed, for instance using a Neural Architecture Search (NAS) type model. Different model architectures can be used depending on the type(s) of data, such as on-board lidar data and road graph information. Thus, any DL model that can be used to classify/regress road wetness using on-board sensor signals and other available prior information (such as road graph data, etc.), may be employed.

Various sensors may be located at different places around the vehicle (see FIGS. 1A-D) to gather data from different parts of the external environment. Certain sensors may have different fields of view depending on their placement around the vehicle and the type of information they are designed to gather. For instance, different sensors may be used for near (short range) detection of objects or conditions adjacent to the vehicle (e.g., less than 2-10 meters), while others may be used for far (long range) detection of objects a hundred meters (or more or less) in front of the vehicle. Mid-range sensors may also be employed. Multiple sensor units such as lidars and radars may be positioned toward the front or rear of the vehicle for long-range object detection. And cameras and other image sensors may be arranged to provide good visibility around the vehicle. Depending on the configuration, certain types of sensors may include multiple individual sensors with overlapping fields of view. Alternatively, other sensors may provide redundant 360° fields of view.

Figure 4:
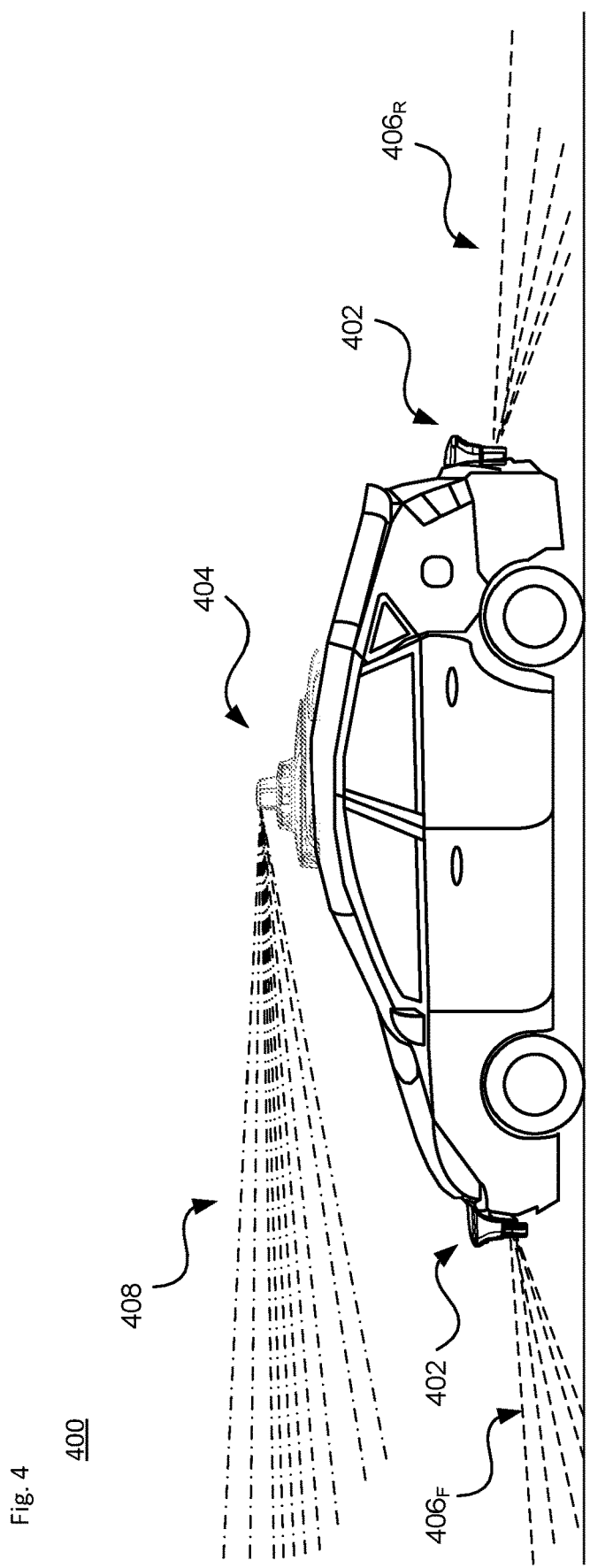
FIG. 4 illustrates an example of detecting ground truth in accordance with aspects of the technology.

FIG. 4 illustrates a scenario 400 in which a vehicle uses one or more sensors to detect the presence of water along the roadway in order to obtain ground truth data. For instance, the ground truth input may include measurements of the water thickness, e.g., water film thickness and/or ice coverage on road surfaces. This can be done at a very granular level, e.g., measuring the thickness on the order of microns. In this scenario, the vehicle may be configured to operate in an autonomous driving mode (or a manual mode), that includes various sensors at different locations along the exterior of the vehicle. This can include front and/or rear sensor units 402, and a roof-based sensor unit 404, each which may include lidar, radar, optical cameras, acoustic sensors and/or other sensors. These or other sensor units may be used to collect signals of the environment around the autonomous vehicle.

By way of example, the ground truth can be collected using sensors (e.g., front and/or rear sensors 402) designed for water thickness, e.g., water film thickness measurement and/or ice coverage. This could include, e.g., a road weather information sensor from Lufft. For instance, the front sensor may obtain data from scans shown via dashed lines 406F, while the rear sensor may obtain data from scans shown via dashed lines 406R. The roof-based sensor assembly may obtain information about objects or conditions around the vehicle as shown by dash-dot lines 408. Notice that the sensors used to collect ground truth data may only be placed in selected vehicles for the training of deep learning models during the development phase. After deployment of such models on-board of the autonomous vehicles, these sensors that measure the road wetness does not need to be installed on vehicles.

The placement of the ground truth collecting sensor(s) around the vehicle may vary depending on the type of vehicle (e.g., sedan, truck, motorcycle, etc.) and other factors, so long as the sensor has a direct line of sight to the relevant portion of the roadway. Spray from tires or other vehicles could potentially have some effect, so to mitigate this the ground truth sensor should be covered by a protective housing. Also, water droplets passing across the sensor's sensing track can impact the optical sensing and affect the measurement. However, by avoiding mounting the sensor right above the tire tracks, the likelihood of water spray flying across the sensing track is small.

Figure 5:
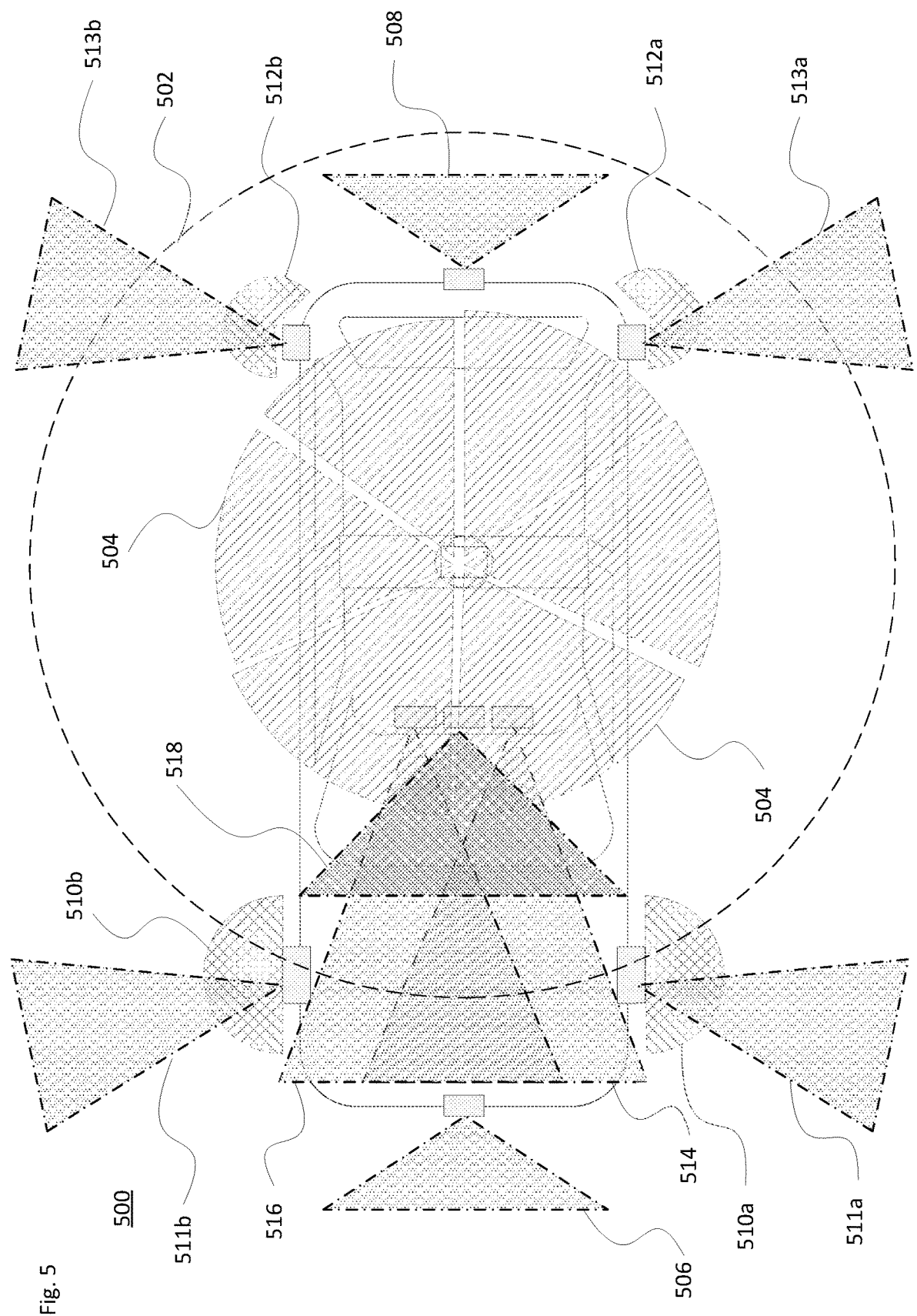
FIG. 5 illustrates example sensor fields of view for a passenger-type vehicle in accordance with aspects of the disclosure.

Besides sensors used for ground truth, FIG. 5 provides one example 500 of sensor fields of view relating to the sensors illustrated in FIG. 1B. Here, should the roof-top housing 102 include a lidar sensor as well as various cameras, radar units, infrared and/or acoustical sensors, each of those sensors may have a different field of view. Thus, as shown, the lidar sensor may provide a 360° FOV 502, while cameras arranged within the housing 102 may have individual FOVs 504. A sensor within housing 104 at the front end of the vehicle has a forward facing FOV 506, while a sensor within housing 112 at the rear end has a rearward facing FOV 508. The housings 106a, 106b on the driver's and passenger's sides of the vehicle may each incorporate lidar, radar, camera and/or other sensors. For instance, lidars within housings 106a and 106b may have a respective FOV 510a or 510b, while radar units or other sensors within housings 106a and 106b may have a respective FOV 511a or 511b. Similarly, sensors within housings 108a, 108b located towards the rear roof portion of the vehicle each have a respective FOV. For instance, lidars within housings 108a and 108b may have a respective FOV 512a or 512b, while radar units or other sensors within housings 108a and 108b may have a respective FOV 513a or 513b. And the series of sensor units 116 arranged along a forward-facing direction of the vehicle may have respective FOVs 514, 516 and 518. Each of these fields of view is merely exemplary and not to scale in terms of coverage range.

Figure 6A:
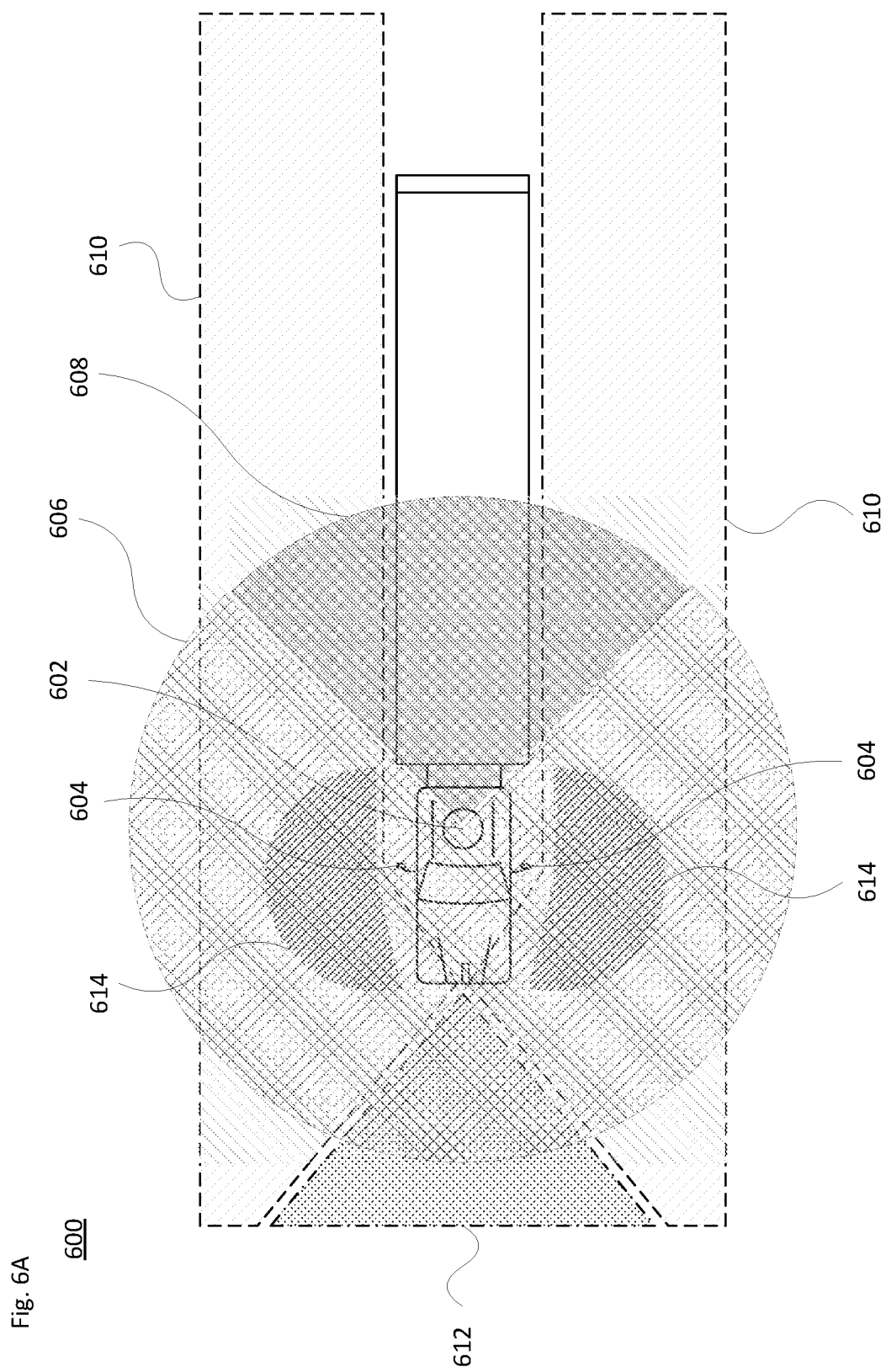
FIGS. 6A-B illustrate example sensor fields of view for a cargo-type vehicle in accordance with aspects of the disclosure.
Figure 6B:
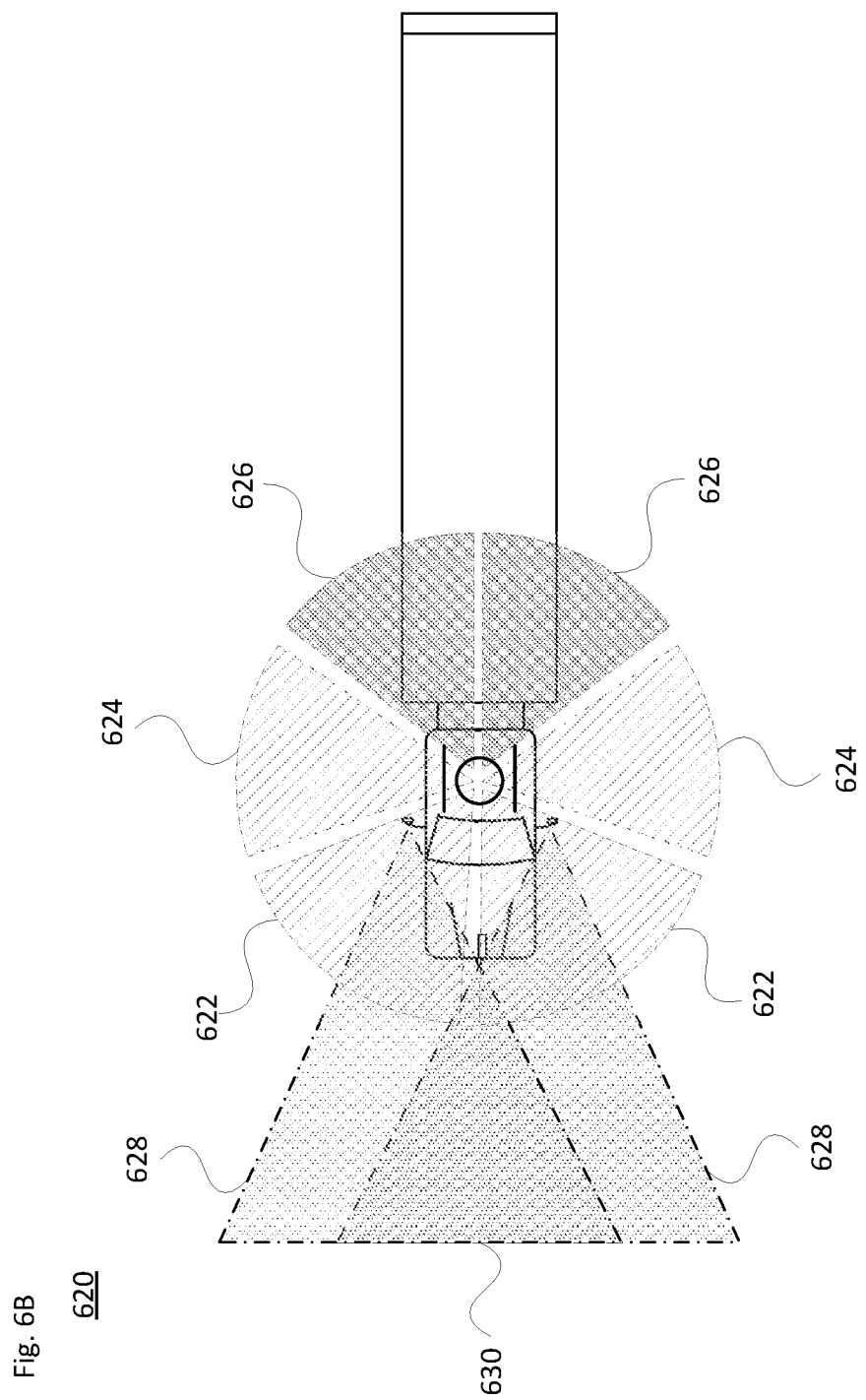

Examples of lidar, camera and radar sensors and their fields of view for a cargo-type vehicle (e.g., vehicle 150 of FIGS. 1C-D) are shown in FIGS. 6A and 6B. In example 600 of FIG. 6A, one or more lidar units may be located in rooftop sensor housing 602, with other lidar units in side sensor housings 604. In particular, the rooftop sensor housing 602 may be configured to provide a 360° FOV. A pair of sensor housings 604 may be located on either side of the tractor unit cab, for instance integrated into a side view mirror assembly or along a side door or quarter panel of the cab. In one scenario, long range lidars may be located along a top or upper area of the sensor housings 602 and 604. The long range lidar may be configured to see over the hood of the vehicle. And short range lidars may be located in other portions of the sensor housings 602 and 604. The short range lidars may be used by the perception system to determine whether an object such as another vehicle, pedestrian, bicyclist, etc. is next to the front or side of the vehicle and take that information into account when determining how to drive or turn. Both types of lidars may be co-located in the housing, for instance aligned along a common vertical axis.

As illustrated in FIG. 6A, the lidar(s) in the rooftop sensor housing 602 may have a FOV 606. Here, as shown by region 608, the trailer or other articulating portion of the vehicle may provide signal returns, and may partially or fully block a rearward view of the external environment. Long range lidars on the left and right sides of the tractor unit have FOV 610. These can encompass significant areas along the sides and front of the vehicle. As shown, there may be an overlap region 612 of their fields of view in front of the vehicle. The overlap region 612 provides the perception system with additional or information about a very important region that is directly in front of the tractor unit. This redundancy also has a safety aspect. Should one of the long range lidar sensors suffer degradation in performance, the redundancy would still allow for operation in an autonomous mode. Short range lidars on the left and right sides have smaller FOV 614. A space is shown between different fields of view for clarity in the drawing; however in actuality there may be no break in the coverage. The specific placements of the sensor assemblies and fields of view is merely exemplary, and may different depending on, e.g., the type of vehicle, the size of the vehicle, FOV requirements, etc.

FIG. 6B illustrates an example configuration 620 for either (or both) of radar and camera sensors in a rooftop housing and on both sides of a tractor-trailer, such as vehicle 150 of FIGS. 1C-D. Here, there may be multiple radar and/or camera sensors in each of the sensor housings 602 and 604 of FIG. 6A. As shown, there may be sensors in the rooftop housing with front FOV 622, side FOV 624 and rear FOV 626. As with region 608, the trailer may impact the ability of the sensor to detect objects behind the vehicle. Sensors in the sensor housings 604 may have forward facing FOV 628 (and side and/or rear fields of view as well). As with the lidars discussed above with respect to FIG. 6A, the sensors of FIG. 6B may be arranged so that the adjoining fields of view overlap, such as shown by overlapping region 630. The overlap regions here similarly can provide redundancy and have the same benefits should one sensor suffer degradation in performance.

Example Scenarios

Figure 7:
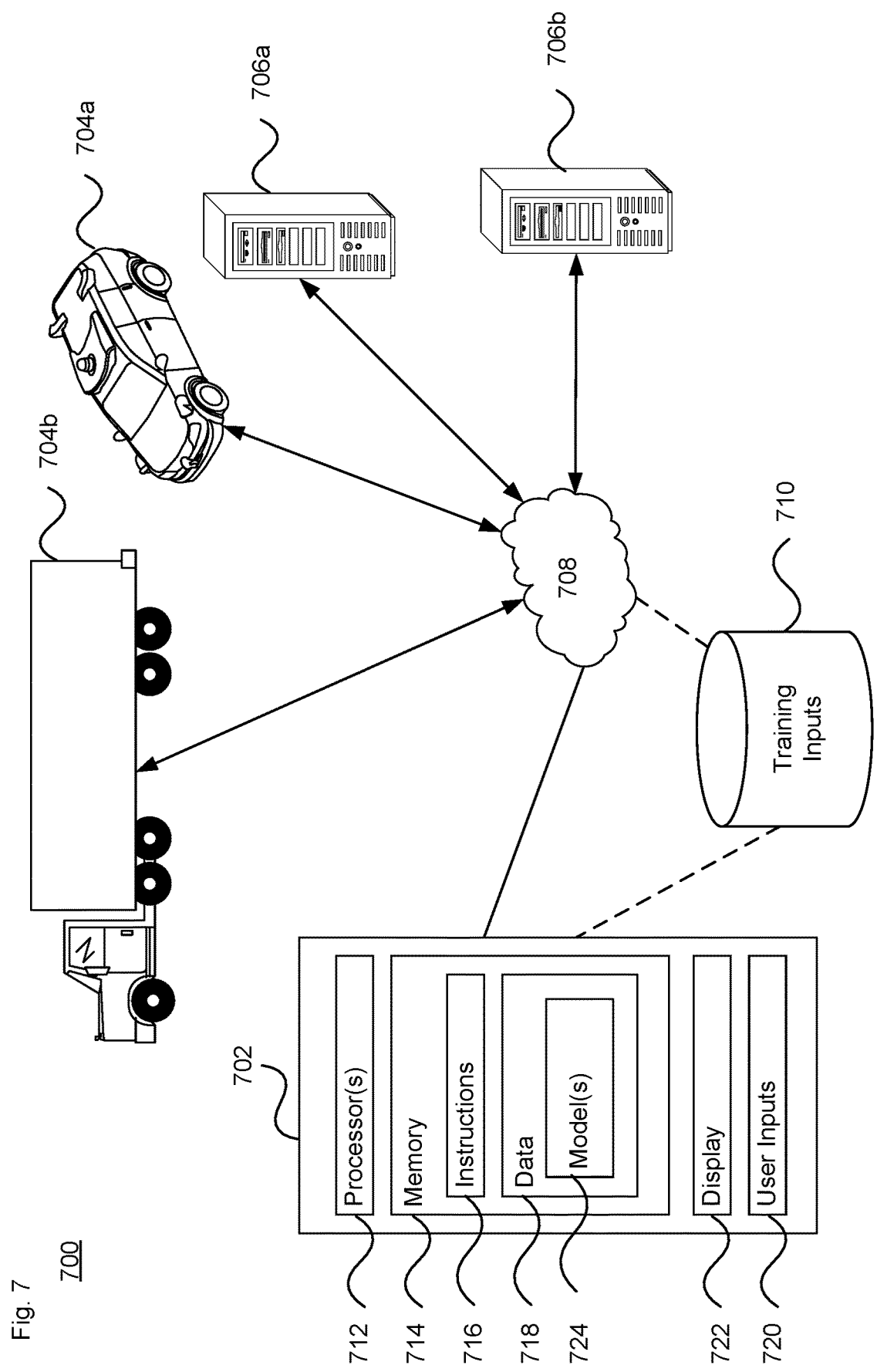
FIG. 7 illustrates an example system in accordance with aspects of the technology.

As shown in example 700 of FIG. 7, a processing system 702 may receive various inputs from vehicles and other sources. For instance, on-board signals received from a passenger vehicle 704a or a truck 704b can include lidar returns, camera images/on-board video, radar returns, audio signals, and ground truth via a road wetness sensor output (e.g., from a sensor configured to detect road weather information including water film height, ice percentage, etc. via optical spectroscopy or other technique). In addition, the output from other perception modules/models of the vehicle (e.g., puddle detectors and filtering modules), may also be part of the on-board signals.

Off-board signals provided by external sources 706 (e.g., 706a and 706b) can include, by way of example, weather station information, public weather forecasts, road graph data, human-labeled road wetness ground truth examples, crowdsourced information, and observations from other vehicles (e.g., as part of a fleet of vehicles) in nearby locations to give additional context about the road wetness.

Figure 8:
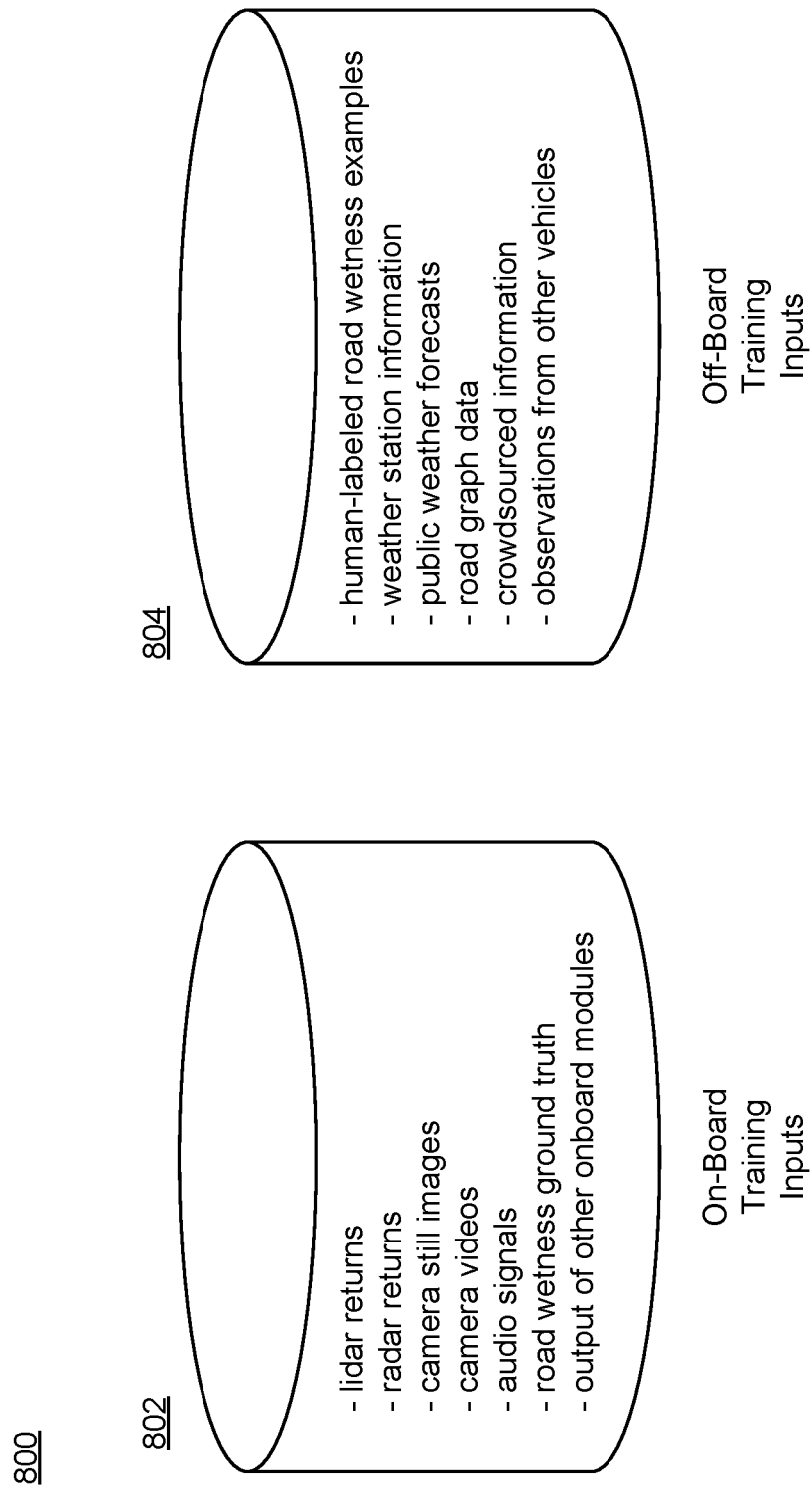
FIG. 8 illustrates examples of on-board and off-board training inputs in accordance with aspects of the technology.

Example 800 of FIG. 8 illustrates such on-board factors 802 and offboard factors 804, which can be gathered via a network 708 and stored as training inputs 710 as shown in FIG. 7. Here, for instance, the weather station information and public weather forecasts may come from a third party source(s) or external system 706a. The road graph data, human-labeled wetness ground truth examples, observations from other vehicles, etc., may come from system 706b.

As shown, the processing system 702 includes one or more processors 712, memory 714 having instructions 716 and data 718, as well optional user inputs 720 and a display 722. Each of these may be configured and operate in a manner equivalent to what is described above with regard to the computing devices and processing systems of FIGS. 2 and 3A-B. The data 718 may include one or more models 724, such as the DL models described herein.

Some or all of these signals may be fused together. For example, machine leaning can handle fusion from different sources. Machine learning takes input from multiple sensors and builds a model to output the final results. In this modeling process all the inputs (or a selected subset of the inputs) are fused together. This can be done by creating special embedding layers in the model that combine input in a human-engineered way, or directly build an end-to-end architecture that takes all input directly into the model. The embedding layers can be human engineered, or also the embeddings can be learned. The sensor data and embeddings can be combined anywhere in the model, at the very beginning as raw data, later as embeddings, or somewhere in between.

Different signals may be given different weights. For instance, one can construct human-engineered features from raw sensor inputs, where some a priori knowledge regarding which sensor should be emphasized can be encoded into the construction of a feature. By way of example, the system may aggregate the lidar data in an area into a single value to be used as the input in the model but gives different weights to points at different places in the area when constructing this value. Another approach is to utilize the learning capability of the deep net and include the weights of different input into model parameters. Then the weights of different input can be learned in the model training process.

In one scenario, the models learn the embeddings and the weights on each one. There are two kinds of weights. First, in the input, different inputs may be weighted differently. This can be done with embedding layers that are human engineered (e.g., selected by a system engineer), or simply figured out by the model itself when it trains and converges to different weights for different input channels. These weights may generally be the same for all examples.

The second kind is the weight that can be assigned to different examples, quantifying how important they are for evaluation of model quality. For example, in classification model, the examples with ground truth water film height very close to the threshold of dry/wet are assigned with less weight, because it is more likely that the binarization into dry/wet of such examples are ambiguous and/or the ground truth from such examples may be corrupted with measurement noise.

Figure 9:
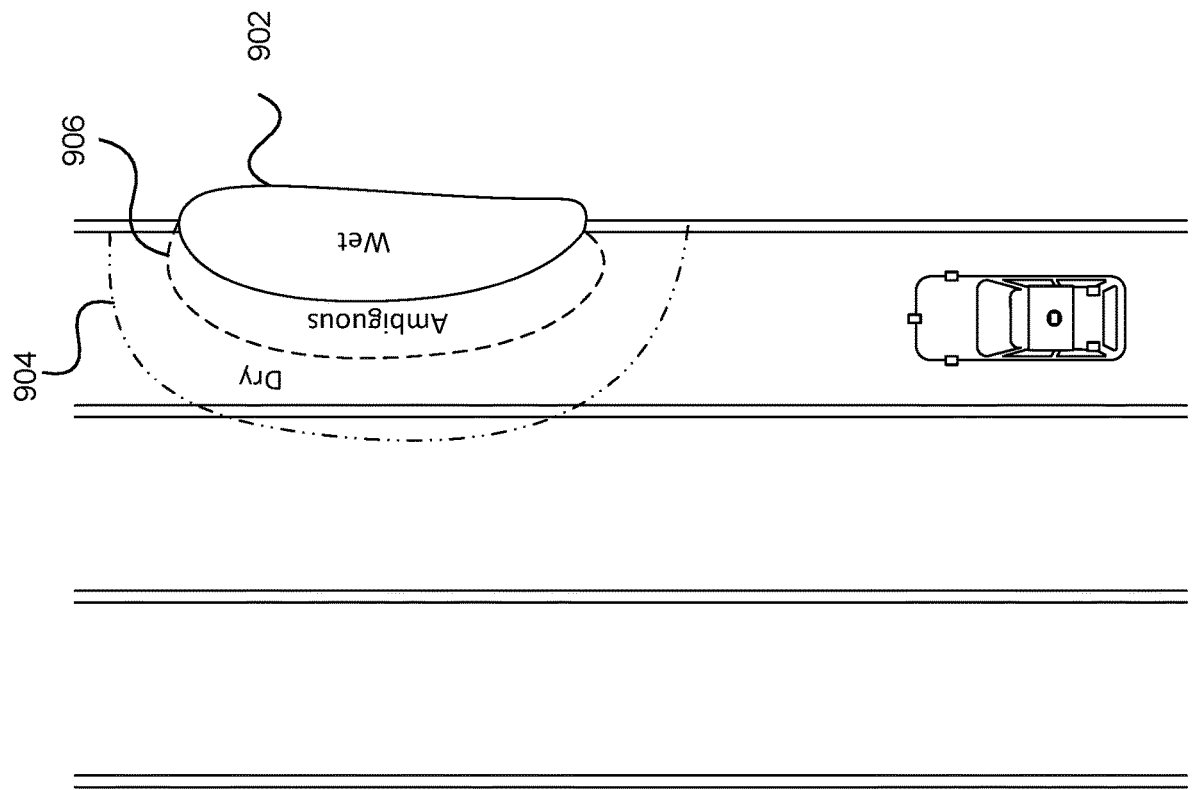
FIG. 9 illustrates an example of roadway wetness in accordance with aspects of the technology.

The road may have a continuum of conditions from wet to dry. The system may seek to identify regions of the roadway that are wet, regions that are dry, and potentially ambiguous areas in between. For instance, example 900 of FIG. 9 illustrates that a portion 902 of the rightmost lane is wet. This may be due to a puddle or accumulation of water that is, e.g., 1.0-4.0 mm deep (or more). The dry region 904 may have no water accumulation (e.g., less than 0.03 mm). And there may be an area 906 between the wet and dry regions that may have some water accumulation (e.g., a water film of between 0.02-2.0 mm), where it may be ambiguous as to whether this should be classified as "wet" or "dry". In one scenario, the information for the ambiguous region may be given less weight, as indicated above for the second kind of weighting.

Road wetness values can indicate a probability of whether that portion of the roadway is wet at all, or how wet it is. For classification models, the output of the model is not simply some classes (e.g., "wet" or "dry"), but a probability that some road region falling into certain classes. The probability can indicate how confident the system is with the classification results, and also if there are any alternative potential classes with lower probability. Thus, for the example of FIG. 9, the region 906 may have a higher probability (e.g., 60-90%) of being "wet", and a lower probability (e.g., 10-30%) of being "dry".

The model output can have different granularity. By way of example, for classification models there could be only two classes such as dry/wet, or more classes based on water film height, such as one class for each increment of certain water film height (e.g., each 0.25, 0.5 or 1.0 mm). There could even be a regression model that provides continuous estimation of water film height on the road. The granularity may be decided based on needs and requirements when making (autonomous) driving decisions. By way of example, granularity may be useful when deciding whether to drive through or avoid a particular section of the (wet) roadway.

While wet and dry are two outputs of the model, additional granularity can include, by way of example only, "slightly wet" (e.g., damp) where there is some amount of moisture on the road surface below a threshold for "wet"; "icy" where the water is substantially in the form of ice (e.g., a percentage of ice crystals in a sample exceeds a threshold); "snow" where the water is in the form of small white ice crystals that covers a selected portion of the roadway; "chemically wet", e.g., where the water molecules have not turned to ice due to a de-icing chemical on the roadway; and/or "other", for instance where the specific nature of the road condition does not fall into any other category.

Statistical analysis may be employed before building the DL models, e.g., to discover which on-board signals correlate most effectively with the ground truth, and also to eliminate or deemphasize any on-board signals or external parameters that do not have good correlation with the ground truth. Relevant statistical parameters include mean and standard deviation values for the sensor data. The sensor signal returns can be bucketed based on different conditions (e.g., distance from the self-driving vehicle). This helps determine the useful range and to eliminate conditions that do not matter or otherwise affect the statistics. For instance, road materials, road wear or surface type (e.g., grooved) may not be relevant, and off-road returns excluded. Temperature, light conditions and other ambient factors may or may not be relevant.

Another factor can include identifying the placement/positioning of the on-board sensors that provide the most useful information. During a testing phase, the sensors may be placed at different locations along the vehicle to see which one gives stronger signals (e.g., signals that more closely correlate with the measured road wetness ground truth.

The result of this analysis is a highly useful subset of data, which masks out returns from dynamic objects on the roadway to avoid the noise introduced by vehicles, pedestrians, bicyclists and other road users. For instance, lidar sensor information may include intensity and reflectivity, and the statistical evaluation may show that intensity is more relevant than reflectivity. Thus, a strong signal input may be laser data that is limited in range and height. By way of example only, the range of the laser points that yields the most difference between wet and dry road surfaces may be on the order of 30-50 m from the vehicle, and the threshold to separate wet and dry road surfaces based on measured water film thickness may be on the order of 5-20 μm. In addition, the reflection of light on water impacts the return intensity because water changes how much light gets reflected back to and away from the sensor. This is the primary signal. Height gives geometry information and helps determine which point is from the road. Elongation and secondary return give additional information regarding the reflection surface. Another useful input is road graph data from a map, which gives information of what points are on road or off road.

The probability of road wetness is the output of the classification model. To obtain a dry/wet classification, a threshold on the probability is given. An example is using probability of wet=0.5 as the threshold. During the training of the model, this classification is compared to the ground truth as an evaluation of the quality of the current model, and the model parameters are adjusted accordingly.

The model structure is a deep net, where the exact structure and parameters can be searched through automated machine learning. This may be done by a method of automated machine learning such as NAS, which is a technique for automating the design of artificial neural networks instead of human designed architecture. According to one aspect of the technology, automated machine learning techniques are used to optimize the design of the model. Examples of automated model selection include variants of NAS (such as TUNAS), automated hyperparameter optimization (such as Vizier), and automated data augmentation. This way, the document can achieve a better understanding in the general machine learning audience. An example process would be to give a set of basic model architecture elements (such as some representative layers) and use reinforcement learning to search for the best combination among these elements.

Model accuracy can be improved in different ways. This can include smoothing the measurements from the road wetness sensor(s) to obtain a more robust estimation of ground truth, balancing wet and dry examples in training dataset to avoid models with skewed performance, and designing a loss function that gives more emphasis to the examples of higher confidence to be wet or dry. The system may use a low pass filter to filter out high frequency noise.

The loss function can be the weighted sum, among all training examples, of the square of the difference between the ground truth and the model output. In the weighted sum, higher weights are assigned to examples with higher confidence while the examples with lower confidence gets lower weights.

FIG. 10 illustrates an example 1000 of the road condition deep learning model architecture in accordance with aspects of the technology. The architecture may be implemented via the processing system of FIG. 7. As shown in block 1002, both signals 1002A from onboard sensors and offboard signals 1002E are inputs to the system (e.g., training inputs 710 of FIG. 7). These inputs, which may be any or all of the types described above, are fed into a feature extraction layer 1004. The feature extraction layer takes an initial set of input data and builds derived features. These features may be of reduced dimensions, may be informative and non-redundant, may facilitate the subsequent learning, and may lead to better human interpretations. The extracted features are applied to a pooling layer 1006. The pooling layer can reduce the dimension of data representation, and the number of parameters need to be learnt in the model, and enable smaller model structure and faster learning.

The pooled information output by the pooling layer 1006 is fed into a module 1008 that includes a convolution layer 1010 and an activation layer 1012. The convolution layer 1010 transforms input images into images of potentially different size and parameters, and thus extracts features that maybe hidden in the input images. The activation layer 1012 provides non-linearity to the model through different activation functions. Processing within the module 1008 may be repeated multiple times, as indicated by dash-dot line 1013. Repeating such layers adds depth to the deep learning models and allow us to learn more complicated model structures. The exact number of repetition (e.g., 2, 3, or more times) can be both human-engineered or searched through NAS.

Next, data output from module 1008 is fed to a fully connected layer 1014. The fully connected layer integrates outputs from the previous layer into a vector of desired size. This may capture the complicated relationship among high-level features. Output 1016 is, e.g., the classification or the continuous estimation of the road wetness. Thus, the various layers form the road wetness model, and the model gives output 1016 such as classification or estimation. While individual layers 1004, 1006, 1010, 1012 and 1014 are shown in example 1000 of FIG. 10, there can be one or more such layers for each of feature extraction, pooling, convolution, activation, and fully connected. It is also possible that one or more of these layers are not present in the model. For instance, in some scenarios the pooling, convolution and/or activation layers may be omitted.

The end result of this modeling approach is the ability to give a discrete classification or continuous regression/estimation of road wetness, which has a number of beneficial uses. These include the triggering of safety precautions (e.g., pulling over for roads too wet to handle); causing a change in real-time motion control (e.g., adjusting acceleration/deceleration, braking distance, changing lanes, etc.); making changes to the perception system (e.g., modifying thresholds for filtering, sensor noise level, sensor field of view adaptation, sensor validation logic, pedestrian detectors, etc.); affecting how the wiper system (or any sensor cleaning system) operates; changing models for predicting behavior of other road users (e.g., other vehicles might drive slower, pedestrians or bicyclists might move erratically to avoid rain/puddles, etc.,); and changing planner behavior (such as where to pick up or drop off, selecting alternative routes or lanes of travel, etc.). Such information may be provided to vehicles across a fleet of vehicles, such as part of a general system update or based on current or projected weather conditions to assist scheduling and routing of the fleet.

Figure 11A:
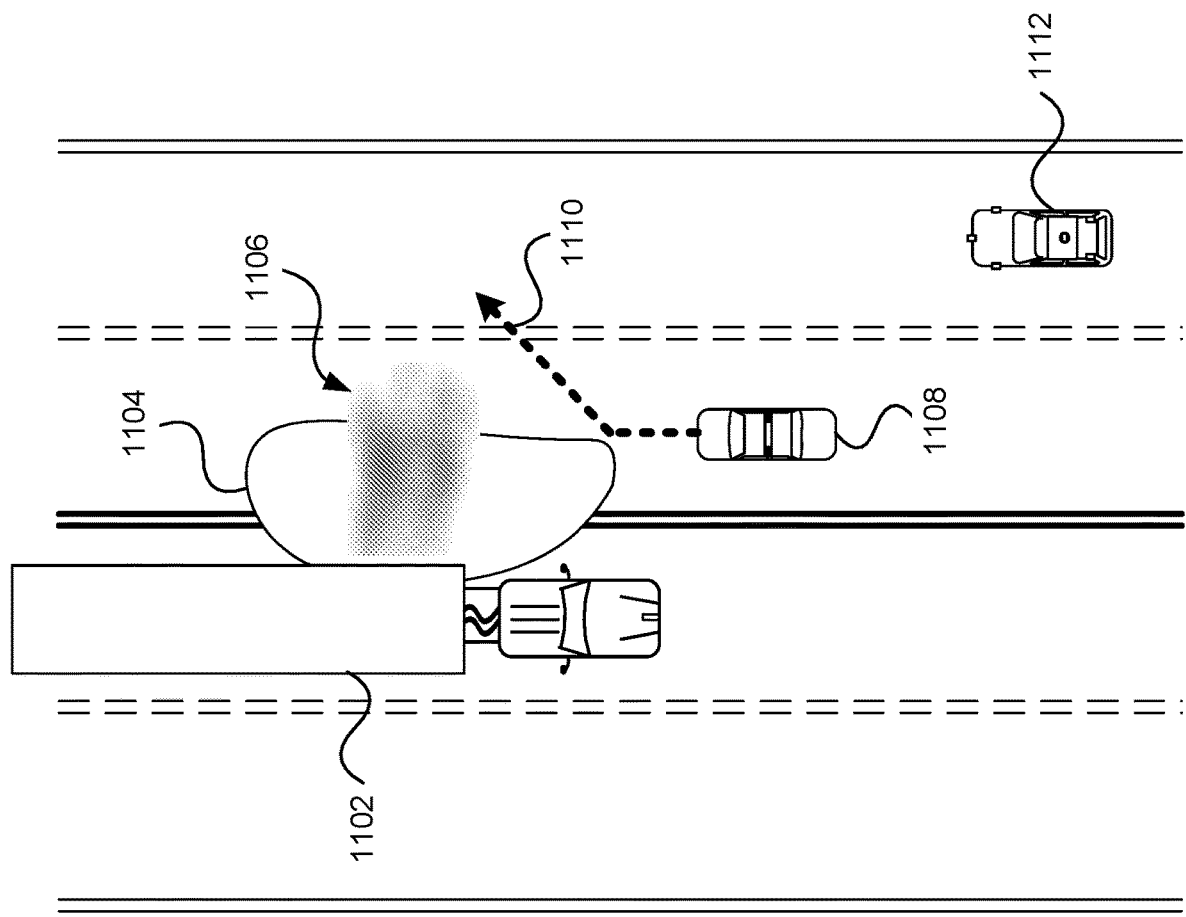
FIGS. 11A-B illustrate driving modification scenarios in accordance with aspects of the technology.

For instance, FIG. 11A illustrates a first scenario 1100, in which a truck 1102 runs over a wet region 1104 of a roadway. As shown, this causes a spray of water 1106 from the truck's tires. In this scenario, car 1108 may determine that there will be the spray of water based on the road conditions (e.g., depths of the water film on the roadway). Thus, in response to this determination, the car 1108 may make an adjustment to the driving path as shown by dotted line 1110, in view of other objects along the roadway such as vehicle 1112.

Figure 11B:
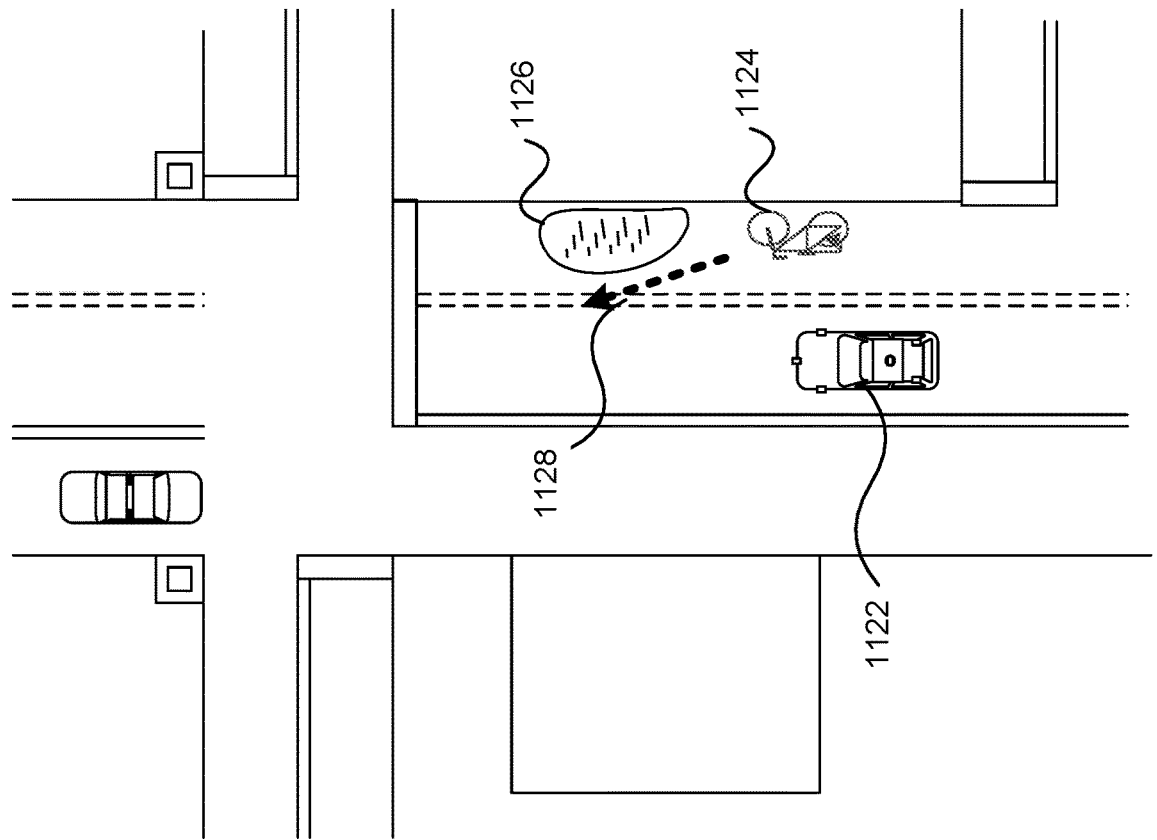

FIG. 11B illustrates a second scenario 1120, in which vehicle 1122 observes bicycle 1124 approaching a wet area (e.g., a puddle) 1126. Here, based on information according to the road wetness model and other factors (such as an observed object being a bicycle), the vehicle 1122 may predict that the bicycle will alter its trajectory to avoid the wet area as shown by dotted line 1128. As a result, the vehicle 1122 may brake or cease accelerating to allow the bicycle 1124 sufficient room to move around the wet area.

As noted above, the technology is applicable for various types of wheeled vehicles, including passenger cars, buses, motorcycles, RVs, emergency vehicles, and trucks or other cargo carrying vehicles.

In addition to using the road condition model information for operation of the vehicle, this information may also be shared with other vehicles, such as vehicles that are part of a fleet. This can be done to aid in route planning, gathering of additional ground truth data, model updates, etc.

Figure 12A:
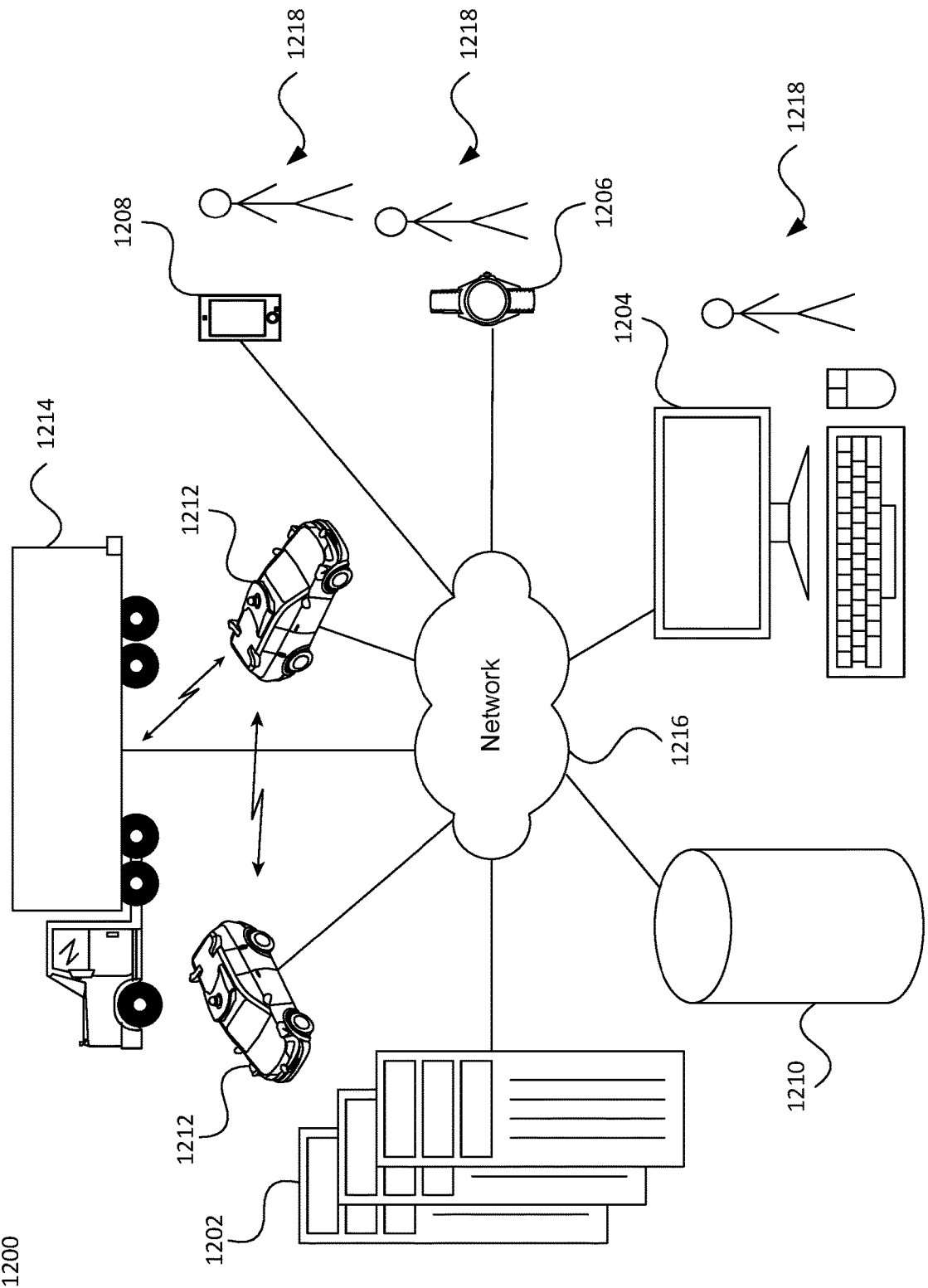
Figure 12B:
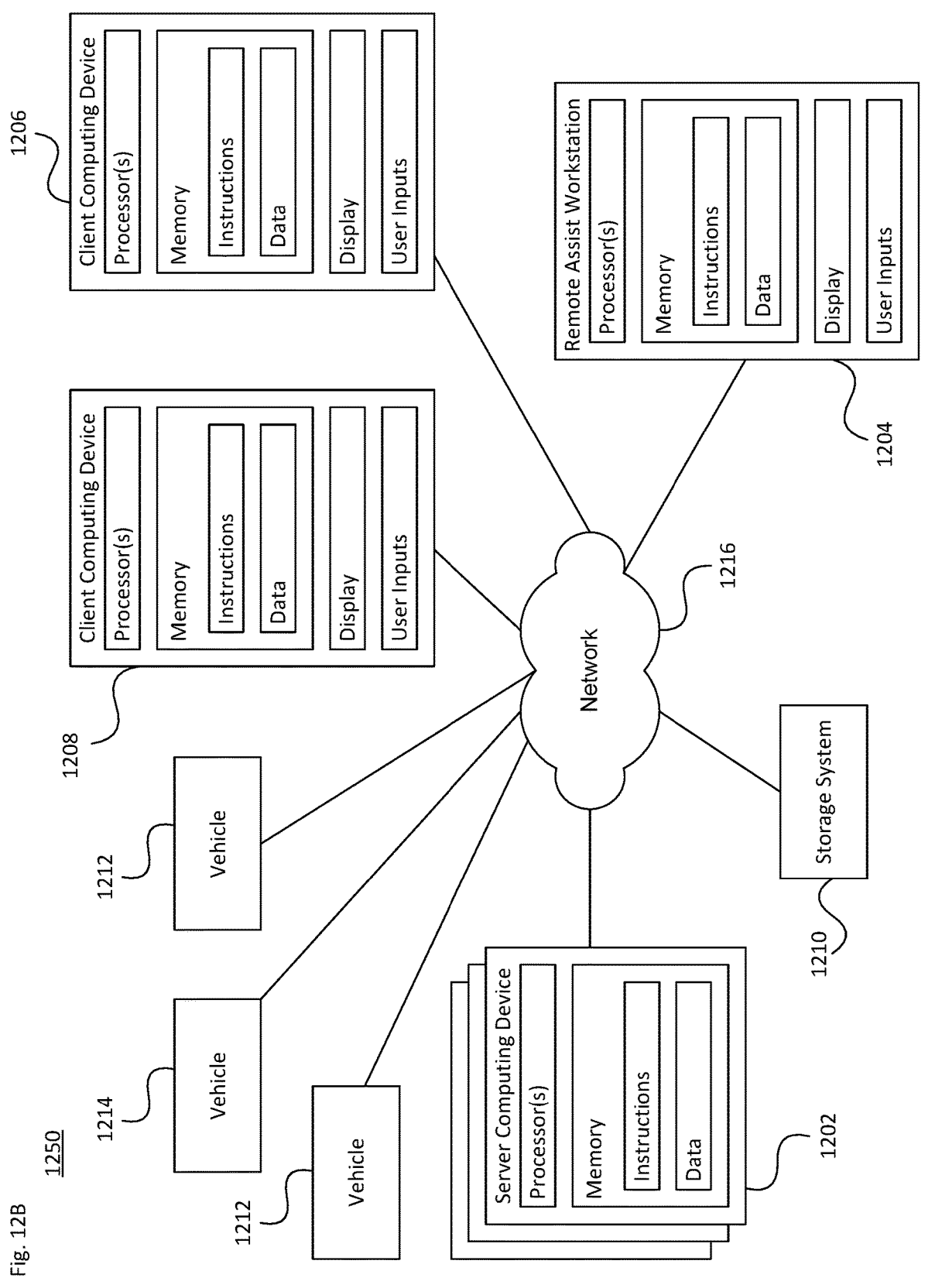

One example of data sharing is shown in FIGS. 12A and 12B. In particular, FIGS. 12A and 12B are pictorial and functional diagrams, respectively, of an example system 1200 that includes a plurality of computing devices 1202, 1204, 1206, 1208 and a storage system 1210 connected via a network 1216. System 1200 also includes exemplary vehicles 1212 and 1214, which may be configured the same as or similarly to vehicles 100 and 150 of FIGS. 1A-B and 1C-D, respectively. Vehicles 1212 and/or vehicles 1214 may be part of a fleet of vehicles. Although only a few vehicles and computing devices are depicted for simplicity, a typical system may include significantly more.

As shown in FIG. 12B, each of computing devices 1202, 1204, 1206 and 1208 may include one or more processors, memory, data and instructions. Such processors, memories, data and instructions may be configured similarly to the ones described above with regard to FIGS. 2 and 3A-B.

The various computing devices and vehicles may communicate via one or more networks, such as network 1216. The network 1216, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1202 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 1202 may include one or more server computing devices that are capable of communicating with the computing devices of vehicles 1212 and/or 1214, as well as computing devices 1204, 1206 and 1208 via the network 1216. For example, vehicles 1212 and/or 1214 may be a part of one or more fleets of vehicles that can be dispatched by a server computing device to various locations. In this regard, the computing device 1202 may function as a dispatching server computing system which can be used to dispatch vehicles to different locations in order to pick up and drop off passengers and/or to pick up and deliver cargo. In addition, server computing device 1202 may use network 1216 to transmit and present information to a user of one of the other computing devices or a passenger of a vehicle. In this regard, computing devices 1204, 1206 and 1208 may be considered client computing devices.

As shown in FIG. 12A each client computing device 1204, 1206 and 1208 may be a personal computing device intended for use by a respective user 1218, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1206 and 1208 may be mobile phones or devices such as a wireless-enabled PDA, a tablet PC, a wearable computing device (e.g., a smartwatch), or a netbook that is capable of obtaining information via the Internet or other networks.

In some examples, client computing device 1204 may be a remote assistance workstation used by an administrator or operator to communicate with passengers of dispatched vehicles. Although only a single remote assistance workstation 1204 is shown in FIGS. 12A-12B, any number of such work stations may be included in a given system. Moreover, although operations work station is depicted as a desktop-type computer, operations works stations may include various types of personal computing devices such as laptops, netbooks, tablet computers, etc.

Storage system 1210 can be of any type of computerized storage capable of storing information accessible by the server computing devices 1202, such as a hard-drive, memory card, ROM, RAM, DVD, CD-ROM, flash drive and/or tape drive. In addition, storage system 1210 may include a distributed storage system where data is stored on a plurality of different storage devices which may be physically located at the same or different geographic locations. Storage system 1210 may be connected to the computing devices via the network 1216 as shown in FIGS. 12A-B, and/or may be directly connected to or incorporated into any of the computing devices.

Storage system 1210 may store various types of information. For instance, the storage system 1210 may also store autonomous vehicle control software and/or road condition models, which may be used by vehicles, such as vehicles 1212 or 1214, to operate such vehicles in an autonomous driving mode. Storage system 1210 may store map information, route information, weather condition information, road surface information, vehicle models for the vehicles 1212 and 1214, weather information, etc. This information may be shared with the vehicles 1212 and 1214, for instance to help with real-time route planning and driving analysis by the on-board computer system(s).

The remote assistance workstation 1204 may access the stored information and use it to assist operation of a single vehicle or a fleet of vehicles. By way of example, a lead vehicle may detect a wet condition, such as due to standing water, ice or snow along a road segment, and send information about the wet condition to the remote assistance workstation 1204. In turn, the remote assistance workstation 1204 may disseminate the information to other vehicles in the fleet, so that they may alter their routes.

In a situation where there are passengers, the vehicle or remote assistance may communicate directly or indirectly with the passengers' client computing device. Here, for example, information may be provided to the passengers regarding current driving operations, changes to the route in response to the situation, etc.

Figure 13:
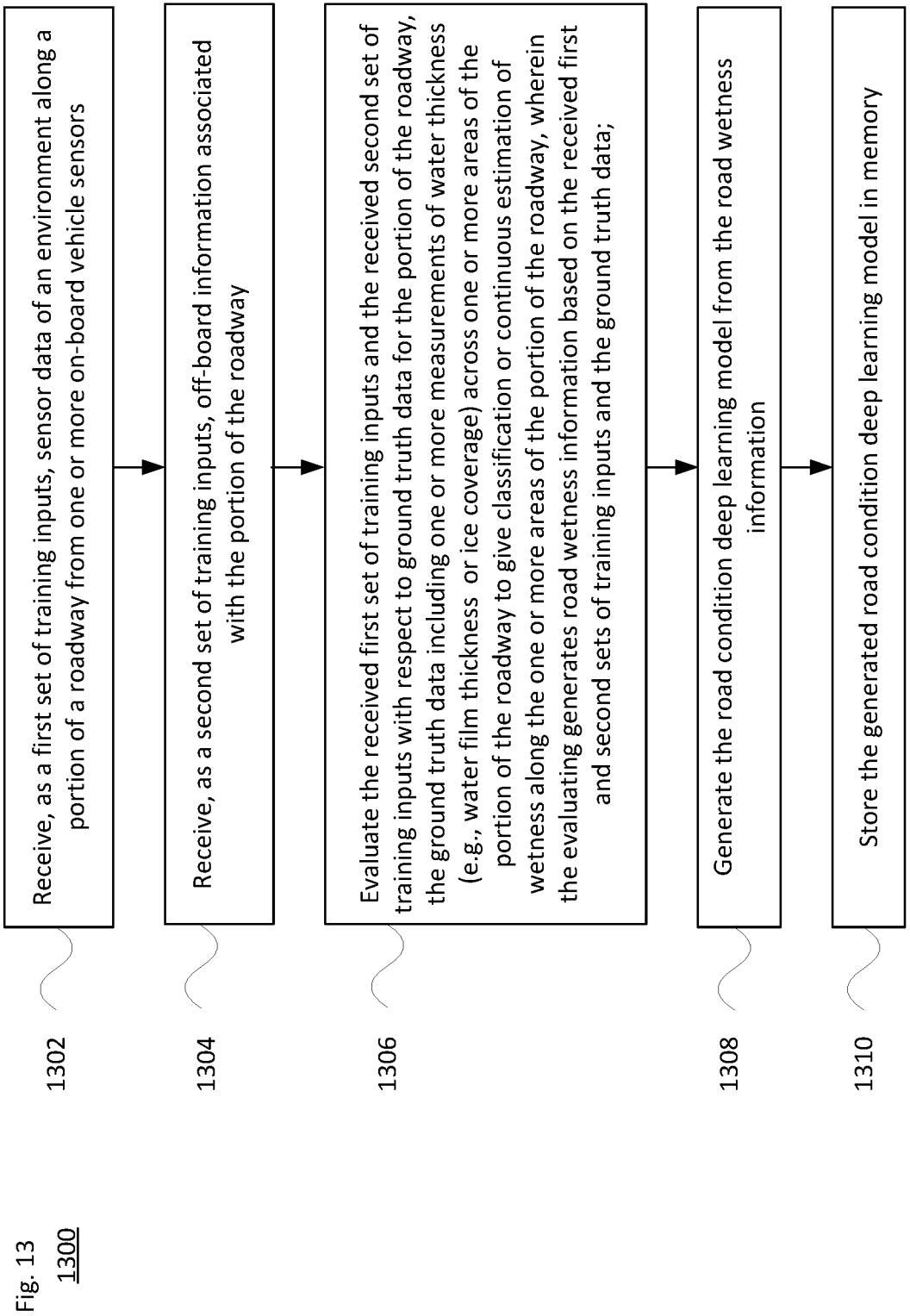
FIG. 13 illustrates an example process in accordance with aspects of the technology.

FIG. 13 illustrates an example process 1300 that is a method for generating a road condition deep learning model. The method comprising receiving at block 1302 as a first set of training inputs, by one or more processors, sensor data of an environment along a portion of a roadway from one or more on-board vehicle sensors. At block 1304 the method includes receiving as a second set of training inputs, by the one or more processors, off-board information associated with the portion of the roadway.

At block 1306 the method includes evaluating, by the one or more processors, the received first set of training inputs and the received second set of training inputs with respect to ground truth data for the portion of the roadway. The ground truth data includes one or more measurements of water thickness, e.g., water film thickness or ice coverage across one or more areas of the portion of the roadway to give classification or continuous estimation of wetness along the one or more areas of the portion of the roadway. The evaluating generates road wetness information based on the received first and second sets of training inputs and the ground truth data.

At block 1308 the method also includes generating the road condition deep learning model from the road wetness information. And at block 1310 the method stores the generated road condition deep learning model in memory. This can be memory of a back-end system such as storage system 1210 of FIGS. 12A-B, or memory of a self-driving vehicle such as memory 206 of FIG. 2 or memory 306 of FIG. 3A. When stored in memory of a self-driving vehicle, the model can be used during real-time driving operations of the vehicle. For instance, the model can be deployed in autonomous vehicles, such as a fleet of vehicles shown in FIG. 12A for classifying/regressing the road wetness with on-board and/or off-board signals as the input, without referring to the ground truth. The model can be applied by each vehicle to enhance autonomous operation. This can include, for instance, altering current driving actions (e.g., changing lanes, slowing down, changing the rate of deceleration, speeding up, etc.), modifying planned routes or trajectories, activating on-board cleaning systems (e.g., a wiper system, defogger, defroster or the like), etc.

Unless otherwise stated, any alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A system configured to operate a vehicle in an autonomous driving mode, the system comprising:
    a driving system configured to perform driving operations of the vehicle;
    a perception system configured to detect objects or conditions in an environment around the vehicle during operation in the autonomous driving mode;
    one or more processors operatively coupled to the driving system and the perception system, the one or more processors being configured to:
        receive sensor data from the perception system of the vehicle while operating in the autonomous driving mode;

use a stored road condition model to generate information associated with a classification or estimation of road wetness based on the received sensor data; and cause the driving system to perform a selected driving operation in the autonomous driving mode in response to the generated information.

2. The system of claim 1, further comprising memory configured to store the road condition model, the memory being operatively coupled to the one or more processors.

3. The system of claim 1, the model having been trained according to a first set of sensor data training inputs of an environment along a portion of a roadway and a second set of ground truth training inputs.

4. The system of claim 3, wherein the first set of sensor data training inputs is obtained from one or more on-board sensors of a vehicle operating on the portion of the roadway.

5. The system of claim 3, wherein the second set of ground truth training inputs comprises off-board information with respect to ground truth data for the portion of the roadway.

6. The system of claim 5, wherein the ground truth data includes a set of water thickness measurements across one or more areas of the portion of the roadway.

7. The system of claim 3, wherein the first set of sensor data training inputs includes one or more of lidar returns, still imagery, video imagery, radar returns, audio signals, or output from a vehicle on-board module.

8. The system of claim 3, wherein the second set of ground truth training inputs includes one or more of weather station information, public weather forecasts, road graph data, crowdsourced information, or observations from a set of vehicles.

9. The system of claim 1, wherein the selected driving operation includes alteration of a current driving action of the vehicle in the autonomous driving mode.

10. The system of claim 1, wherein the selected driving operation includes modification of a planned route of the vehicle.

11. The system of claim 1, wherein the selected driving operation includes modification of a trajectory of the vehicle.

12. The system of claim 1, wherein the selected driving operation includes activation of an on-board cleaning system.

13. The system of claim 1, wherein the selected driving operation includes performance of a safety precaution.

14. The system of claim 1, wherein the one or more processors are further configured to modify a threshold for one or more aspects of the perception system.

15. The system of claim 14, wherein modification of the threshold for the one or more aspects of the perception system including at least one of modification of a threshold for filtering, a sensor noise level, a sensor field of view adaptation, sensor validation logic, or a pedestrian detector.

16. The system of claim 1, wherein the one or more processors are further configured to change a model for predicting behavior of other road users based on the generated information.

17. A method comprising:
receiving, by one or more processors, sensor data from one or more sensors of a perception system of a vehicle, the one or more sensors being configured to detect objects or conditions in an environment around the vehicle;
using, by the one or more processors, a stored a road condition model to generate information associated with a classification or estimation of road wetness based on the received sensor data; and
causing, by the one or more processors, a driving system of the vehicle to perform a selected driving operation in an autonomous driving mode in response to the generated information.

18. The method of claim 17, wherein causing the driving system of the vehicle to perform the selected driving operation in the autonomous driving mode includes at least one of:
triggering one or more safety precautions; or
modifying a threshold for one or more aspects of the perception system.

19. The method of claim 18, wherein causing the driving system of the vehicle to perform the selected driving operation in the autonomous driving mode includes at least one of:
altering a current driving action of the vehicle in the autonomous driving mode; or
modifying a planned route or trajectory of the vehicle.

20. The method of claim 18, wherein causing the driving system of the vehicle to perform the selected driving operation in the autonomous driving mode includes activating an on-board cleaning system of the vehicle.

* * * * *

UNITED STATES PATENT AND TRADEMARK OFFICE
CERTIFICATE OF CORRECTION

PATENT NO. : 12,210,947 B2  
APPLICATION NO. : 18/238741  
DATED : January 28, 2025  
INVENTOR(S) : Xin Zhou et al.

Page 1 of 1

It is certified that error appears in the above-identified patent and that said Letters Patent is hereby corrected as shown below:

In the Claims

Column 22, Line 34, Claim 19:  
Now reads: "The method of claim 18"; should read -- The method of claim 17 --

Column 22, Line 40, Claim 20:  
Now reads: "The method of claim 18"; should read -- The method of claim 17 --

Signed and Sealed this  
Fourth Day of March, 2025

Coke Morgan Stewart  
*Acting Director of the United States Patent and Trademark Office*